US012548960B2

(12) United States Patent
Kim et al.

(10) Patent No.: US 12,548,960 B2
(45) Date of Patent: Feb. 10, 2026

(54) MOLD FOR PRINTING WIRING AND METHOD FOR MANUFACTURING DISPLAY DEVICE USING THE SAME

(71) Applicant: Samsung Display Co., LTD., Yongin-si (KR)

(72) Inventors: Jong Hyup Kim, Incheon (KR); Hae Wook Yang, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 407 days.

(21) Appl. No.: 18/170,490

(22) Filed: Feb. 16, 2023

(65) Prior Publication Data

US 2023/0352896 A1 Nov. 2, 2023

(30) Foreign Application Priority Data

Apr. 1, 2022 (KR) .................. 10-2022-0041140

(51) Int. Cl.
*H01R 43/28* (2006.01)
*H01B 13/00* (2006.01)

(52) U.S. Cl.
CPC ......... *H01R 43/28* (2013.01); *H01B 13/0009* (2013.01); *H01B 13/0036* (2013.01)

(58) Field of Classification Search
None
See application file for complete search history.

(56) References Cited

U.S. PATENT DOCUMENTS

| 1,872,482 A * | 8/1932 | Messing | B29C 53/083 |
| | | | 156/196 |
| 3,384,695 A * | 5/1968 | Murray | B29C 59/00 |
| | | | 264/294 |
| 4,557,684 A * | 12/1985 | Romine | B41F 27/1287 |
| | | | 425/383 |

(Continued)

FOREIGN PATENT DOCUMENTS

KR  10-2008-0097808 A  11/2008
KR  10-2012-0014628 A  2/2012

(Continued)

OTHER PUBLICATIONS

Korean Notice of Allowance issued in corresponding KR Application No. 10-2022-0041140, dated Nov. 13, 2025, 2 pages.

*Primary Examiner* — Emmanuel S Luk
(74) *Attorney, Agent, or Firm* — Womble Bond Dickinson (US) LLP

(57) ABSTRACT

A mold for printing a wiring includes: a bendable part between a first lever part and a second lever part; a first protruding portion protruding from a top face of the bendable part; a second protruding portion protruding from the top face of the bendable part and at one side of the first protruding portion; and a third protruding portion protruding from the top face of the bendable part and at the other side of the first protruding portion. The first and second protruding portions are spaced apart from each other with a first hinge groove therebetween, the first and third protruding portions are spaced apart from each other with a second hinge groove therebetween, and a width of each of the first and second hinge grooves increases as they respectively extends upwardly in the thickness direction.

17 Claims, 24 Drawing Sheets

(56) References Cited

U.S. PATENT DOCUMENTS

| | | | | |
|---|---|---|---|---|
| 4,617,081 | A | * | 10/1986 | Bleau ................. G11B 23/0326 |
| | | | | 156/227 |
| 4,793,793 | A | * | 12/1988 | Swenson ................. B29C 51/36 |
| | | | | 264/545 |
| 5,324,384 | A | * | 6/1994 | Spengler ................. B29C 63/04 |
| | | | | 156/227 |
| 5,705,005 | A | * | 1/1998 | Ash ........................... B32B 3/06 |
| | | | | 156/92 |
| 11,098,401 | B2 | | 8/2021 | Song et al. |
| 2005/0263241 | A1 | * | 12/2005 | Lidicky ............... B29C 66/8322 |
| | | | | 156/216 |
| 2011/0114255 | A1 | * | 5/2011 | Schilles ................. B32B 27/32 |
| | | | | 156/245 |
| 2018/0250923 | A1 | * | 9/2018 | Maas ...................... B32B 38/18 |
| 2020/0298544 | A1 | * | 9/2020 | Ishii ...................... G02F 1/1303 |
| 2025/0282089 | A1 | * | 9/2025 | Takai ..................... B29C 51/42 |

FOREIGN PATENT DOCUMENTS

| | | |
|---|---|---|
| KR | 10-2014-0091965 A | 7/2014 |
| KR | 10-1424135 B1 | 8/2014 |
| KR | 10-1711956 B1 | 3/2017 |
| KR | 10-2018-0002959 A | 1/2018 |
| KR | 10-2020-0006668 A | 1/2020 |
| KR | 10-2020-0100904 A | 8/2020 |
| KR | 10-2160500 B1 | 9/2020 |

* cited by examiner

100: 110, 130, 150

FIG. 4
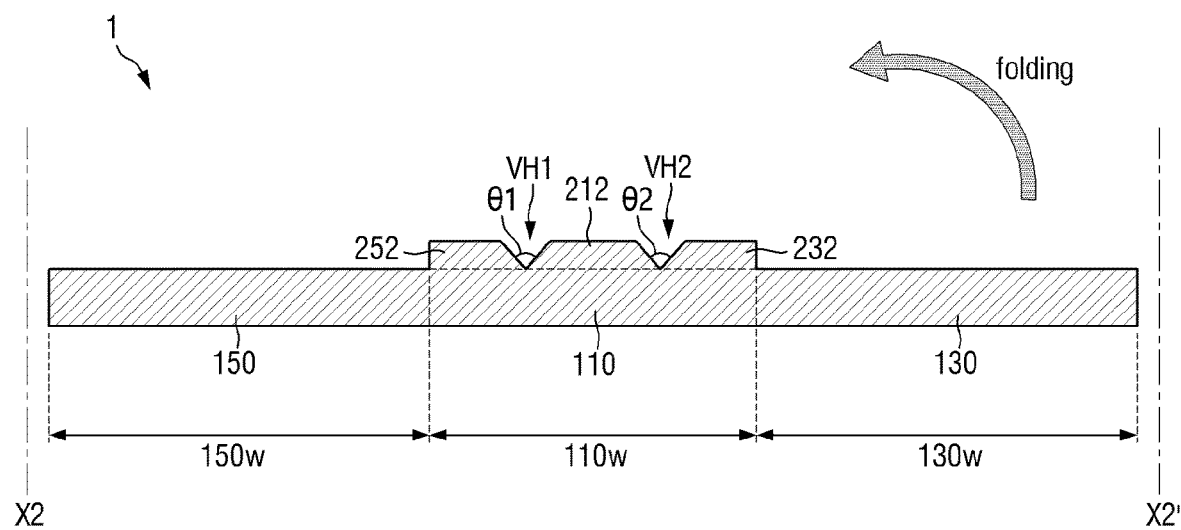
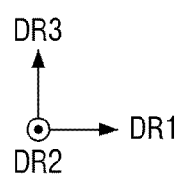

SUB: SUBa, SUBc, SUBd1

FIG. 22
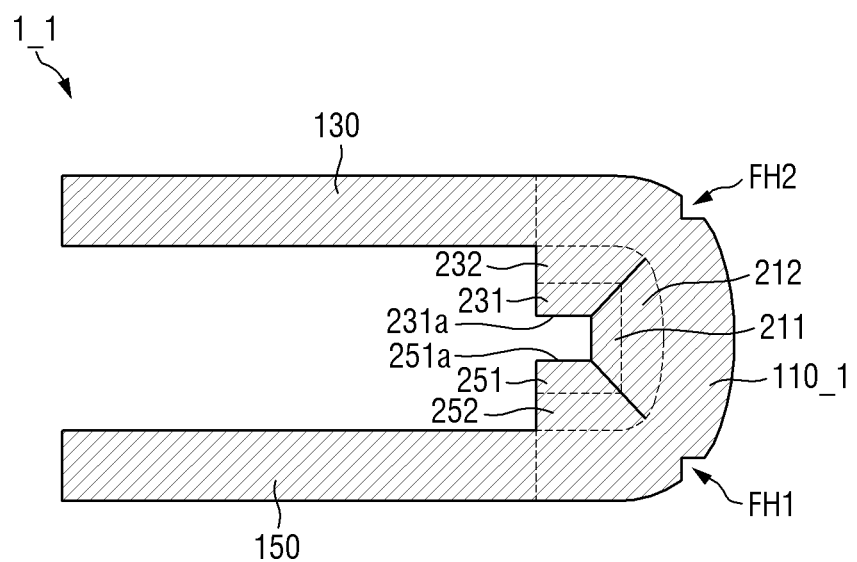
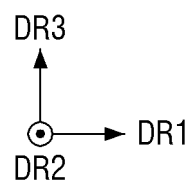
100_1: 110_1, 130, 150
200: 210, 230, 250
210: 211, 212
230: 231, 232
250: 251, 252

FIG. 23
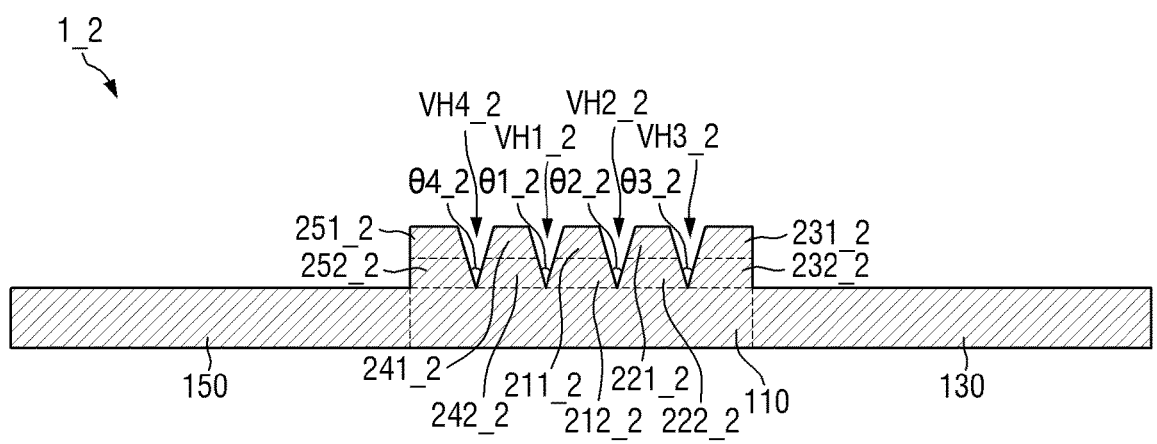
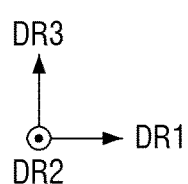
100: 110, 130, 150
200_2: 210_2, 220_2, 230_2, 240_2, 250_2
210_2: 211_2, 212_2
220_2: 221_2, 222_2
230_2: 231_2, 232_2
240_2: 241_2, 242_2
250_2: 251_2, 252_2

FIG. 24
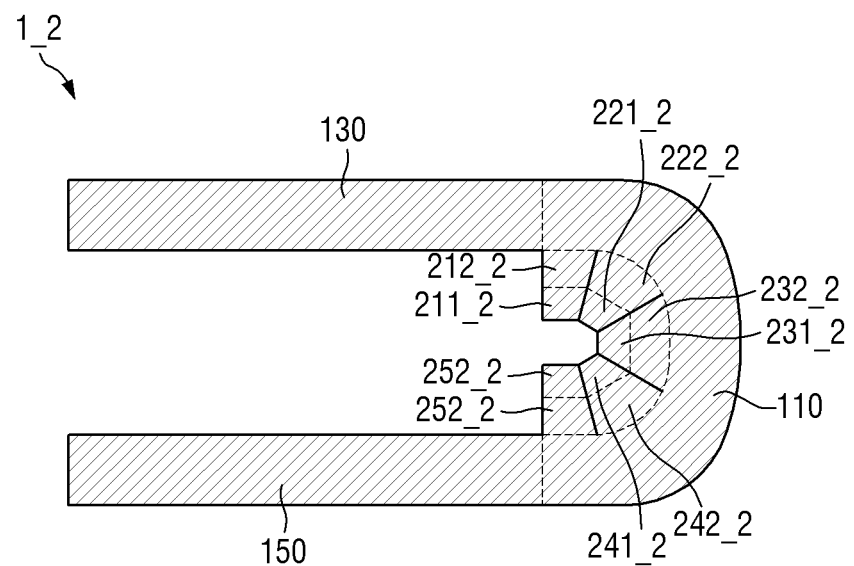
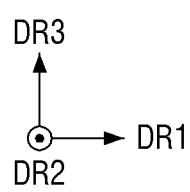
100: 110, 130, 150
200_2: 210_2, 220_2, 230_2, 240_2, 250_2
210_2: 211_2, 212_2
220_2: 221_2, 222_2
230_2: 231_2, 232_2
240_2: 241_2, 242_2
250_2: 251_2, 252_2

MOLD FOR PRINTING WIRING AND METHOD FOR MANUFACTURING DISPLAY DEVICE USING THE SAME

CROSS-REFERENCE TO RELATED APPLICATION

This application claims priority to and the benefit of Korean Patent Application No. 10-2022-0041140, filed on Apr. 1, 2022, in the Korean Intellectual Property Office, the contents of which are incorporated herein in its entirety by reference.

BACKGROUND

1. Field

Aspects of embodiments of the present disclosure relate to a mold for printing a wiring and a method for manufacturing a display device using the same.

2. Description of Related Art

Electronic devices, such as smart phones, tablet PCs, digital cameras, notebook computers, navigation devices, and smart televisions, that provide images to users include display devices for displaying images.

The display device has a display area that operates on a pixel or sub-pixel basis to render (or display) various colors and a bezel area where wirings for driving the pixel or the sub-pixel are disposed.

Recently, there is an increasing demand for bezel-less technology that reduces or eliminates the bezel area to maximize the display area in the display device. In response to this demand, research and development of side-face wiring formation technology for forming a wiring on a side face of a substrate are steadily progressing.

SUMMARY

According to embodiments of the present disclosure, a mold for printing a wiring that improves processability of a process for manufacturing a display device is provided.

Embodiments of the present disclosure also provide a method for manufacturing a display device with improved processability.

Aspects and features of the present disclosure are not limited to the above-mentioned aspects and features. Other aspects and features of the present disclosure that are not expressly mentioned may be understood based on following description and may be more clearly understood based on embodiments of the present disclosure. Further, it will be easily understood that the aspects and features of the present disclosure may be realized according to the claims, their equivalents, and combinations thereof.

According to an embodiment of the present disclosure, a mold for printing a wiring is provided. The mold includes, a first lever part; a second lever part spaced from the first lever part; a bendable part between the first lever part and the second lever part; a first protruding portion protruding from a top face of the bendable part in a thickness direction of the mold; a second protruding portion protruding from the top face of the bendable part in the thickness direction and at one side of the first protruding portion; and a third protruding portion protruding from the top face of the bendable part in the thickness direction and at the other side of the first protruding portion. The first protruding portion and the second protruding portion are spaced apart from each other with a first hinge groove therebetween, the first protruding portion and the third protruding portion are spaced apart from each other with a second hinge groove therebetween, and a width of each of the first hinge groove and the second hinge groove increases as each of the first hinge groove and the second hinge groove extends upwardly in the thickness direction.

In an embodiment, the first hinge groove may be formed by a first side face of the first protruding portion and a first side face of the second protruding portion, the second hinge groove may be formed by a second side face of the first protruding portion and a first side face of the third protruding portions, the first side face of the first protruding portion and the first side face of the second protruding portion may face each other, and the second side face of the first protruding portion and the first side face of the third protruding portion may face each other In an embodiment, the second protruding portion may be adjacent to the first lever part, the third protruding portion may be adjacent to the second lever part, the first lever part may be configured to be folded so that the first side face of the first protruding portion and the first side face of the second protruding portion directly contact each other, and the second lever part may be configured to be folded so that the second side face of the first protruding portion and the first side face of the third protruding portion directly contact each other.

In an embodiment, each of the first protruding portion, the second protruding portion, the third protruding portion, the first hinge groove, and the second hinge groove may extend in a first direction crossing the thickness direction, a plurality of first protrusions protruding from the first protruding portion in the thickness direction may be on the first protruding portion and spaced apart from each other in the first direction, a plurality of second protrusions protruding from the second protruding portion in the thickness direction may be on the second protruding portion and spaced apart from each other in the first direction, and a plurality of third protrusions protruding from the third protruding portion in the thickness direction may be on the third protruding portion and spaced apart from each other in the first direction.

In an embodiment, a first side face of each of the plurality of first protrusions may face a first side face of each of the plurality of second protrusions, a second side face of each of the plurality of first protrusions may face a first side face of each of the plurality of third protrusions, the first side face of each of the plurality of first protrusions may be aligned with the first side face of the first protruding portion, the second side face of each of the plurality of first protrusions may be aligned with the second side face of the first protruding portion, the first side face of each of the plurality of second protrusions may be aligned with the first side face of the second protruding portion, and the first side face of each of the plurality of third protrusions may be aligned with the first side face of the third protruding portion.

In an embodiment, each of the plurality of first protrusions may have a first printing face as a top face thereof in the thickness direction, each of the plurality of second protrusions may have a second printing face as a top face thereof in the thickness direction, each of the plurality of third protrusions may have a third printing face as a top face thereof in the thickness direction, the first lever part and the second lever part may be configured to be folded so that one side of the first printing face and the second printing face contact each other and the other side of the first printing face and the third printing face contact each other.

In an embodiment, the first lever part, the second lever part, and the bendable part may be integrally formed with each other and may include an elastic material.

In an embodiment, the bendable part, the first protruding portion, the second protruding portion, and the third protruding portion may be integrally formed with each other and may include the elastic material.

In an embodiment, each of a length of the first lever part and a length of the second lever part may be greater than a length of the bendable part.

In an embodiment, the bendable part may include a folding-assisting groove recessed from a bottom face of the bendable part, and a width of the folding-assisting groove may narrow as the folding-assisting groove extends in the thickness direction.

In an embodiment, the folding-assisting groove may include: a first folding-assisting groove overlapping the first hinge groove in the thickness direction; and a second folding-assisting groove overlapping the second hinge groove in the thickness direction.

According to an embodiment of the present disclosure, a mold for printing a wiring includes a first lever part; a second lever part spaced from the first lever part; a bendable part between the first lever part and the second lever part; a first protruding portion protruding from the bendable part in a thickness direction of the mold; a second protruding portion protruding from the bendable part in the thickness direction, the second protruding portion being at one side in a first direction of the first protruding portion is spaced from the first protruding portion in the first direction, the first direction crossing the thickness direction; and a third protruding portion protruding from the bendable part in the thickness direction, the third protruding portion being at the other side in the first direction of the first protruding portion and spaced from the first protruding portion in the first direction. Each of a width of the first protruding portion, a width of the second protruding portion, and a width of the third protruding portion narrows as each of the first to third protruding portions extends in the thickness direction.

In an embodiment, a first side face of the first protruding portion and a first side face of the second protruding portion may face each other, a second side face of the first protruding portion and a first side face of the third protruding portion may face each other, the second protruding portion may be adjacent to the first lever part, the third protruding portion may be adjacent to the second lever part, the first lever part may be configured to be folded so that the first side face of the first protruding portion and the first side face of the second protruding portion are in direct contact with each other, and the second lever part may be configured to be folded so that the second side face of the first protruding portion and the first side face of the third protruding portion are in direct contact with each other.

In an embodiment, each of the first protruding portion, the second protruding portion, and the third protruding portion may extend in a second direction crossing the thickness direction and the first direction, a plurality of first protrusions protruding from the first protruding portion in the thickness direction and spaced apart from each other in the second direction may be on the first protruding portion, a plurality of second protrusions protruding from the second protruding portion in the thickness direction and spaced apart from each other in the second direction may be on the second protruding portion, and a plurality of third protrusions protruding from the third protruding portion in the thickness direction and spaced apart from each other in the second direction may be on the third protruding portion.

In an embodiment, a first side face of each of the plurality of first protrusions may face a first side face of each of the plurality of second protrusions, a second side face of each of the plurality of first protrusions may face a first side face of each of the plurality of third protrusions, the first side face of each of the plurality of first protrusions may be aligned with the first side face of the first protruding portion, the second side face of each of the plurality of first protrusions may be aligned with the second side face of the first protruding portion, the first side face of each of the plurality of second protrusions may be aligned with the first side face of the second protruding portion, and the first side face of each of the plurality of third protrusions may be aligned with the first side face of the third protruding portion.

In an embodiment, each of the plurality of first protrusions may have a first printing face as an end face thereof in the thickness direction, each of the plurality of second protrusions may have a second printing face as an end face thereof in the thickness direction, and each of the plurality of third protrusions may have a third printing face as an end face thereof in the thickness direction. The first lever part and the second lever part may be configured to be folded so that one side of the first printing face and the second printing face contact each other and the other side of the first printing face and the third printing face contact each other.

In an embodiment, the first lever part, the second lever part, and the bendable part may be integrally formed with each other and may include an elastic material.

According to an embodiment of the present disclosure, a method for manufacturing a display device includes: providing a mold for printing a wiring, the mold includes a first lever part, a second lever part spaced from the first lever part, a bendable part between the first lever part and the second lever part, and a plurality of protruding patterns protruding in a thickness direction of the mold on the bendable part; providing a substrate, a plurality of pixels being defined on a top face of the substate and a driver for driving the plurality of pixels being on a bottom face of the substrate, the substate having a side face extending between the top face and the bottom face; transferring conductive ink onto the plurality of protruding patterns on the bendable part of the mold; contacting the side face of the substrate with the bendable part of the mold onto which the conductive ink has been transferred; and folding the first lever part and the second lever part of the mold such that the bendable part of the mold onto which the conductive ink has been transferred is brought into contact with the top face and the bottom face of the substrate.

In an embodiment, the plurality of protruding patterns of the mold may include: a first protruding portion; a second protruding portion at one side of the first protruding portion and spaced apart from the first protruding portion; and a third protruding portion at the other side of the first protruding portion and spaced apart from the first protruding portion. Each of a width of the first protruding portion, a width of the second protruding portion, and a width of the third protruding portion may narrow as each of the first to third protruding portions extends in the thickness direction.

In an embodiment, the mold may be made of an elastic material.

The mold for printing the wiring, according to an embodiment, may improve processability of the process for manufacturing the display device.

The method for manufacturing the display device, according to an embodiment, may exhibit improved processability.

Aspects and features of the present disclosure are not limited to those described, and more various aspects and features are included in the present disclosure.

BRIEF DESCRIPTION OF DRAWINGS

The above and other aspects and features of the present disclosure will become more apparent by describing in detail illustrative embodiments thereof with reference to the attached drawings, in which:

FIG. 4 is a cross-sectional view schematically showing a cross section taken along the line X2-X2' in FIG. 2;

FIG. 22 is a view showing a folded state of the mold for printing a wiring according to the embodiment shown in FIG. 21;

FIG. 23 is a diagram showing a structure of a mold for printing a wiring according to a another embodiment; and FIG. 24 is a view showing a folded state of the mold for printing a wiring according to the embodiment shown in FIG. 23.

DETAILED DESCRIPTION

Figure 1:
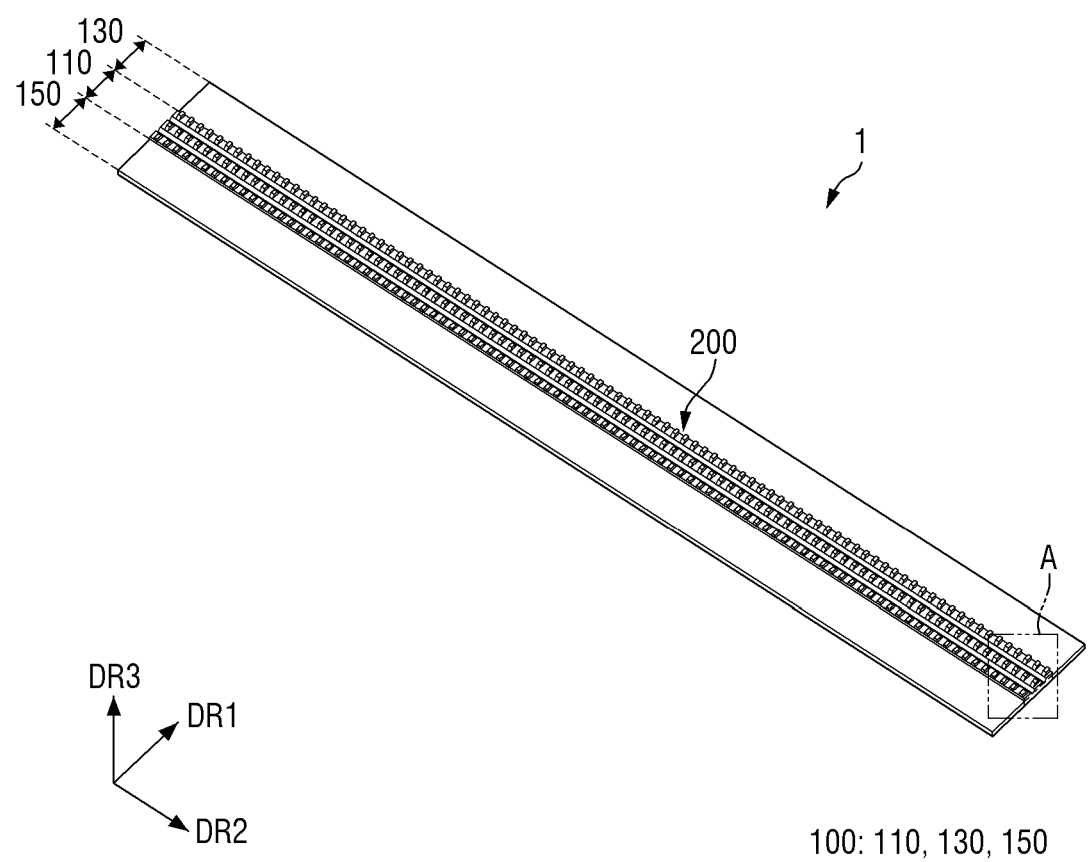
FIG. 1 is a perspective view of a mold for printing a wiring according to an embodiment.

The present disclosure will now be described more fully hereinafter with reference to the accompanying drawings, in which embodiments of the present disclosure are shown. The present disclosure may, however, be embodied in different forms and should not be construed as limited to the embodiments set forth herein. Rather, these embodiments are provided so that this disclosure will be thorough and complete and will filly convey the scope of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. Aspects and features of each of the various embodiments of the present disclosure may be partially or entirely combined with each other and may technically variously interwork with each other, and respective embodiments may be implemented independently of each other or may be implemented together in association with each other.

Hereinafter, embodiments of the present disclosure will be described with reference to the accompanying drawings.

Figure 2:
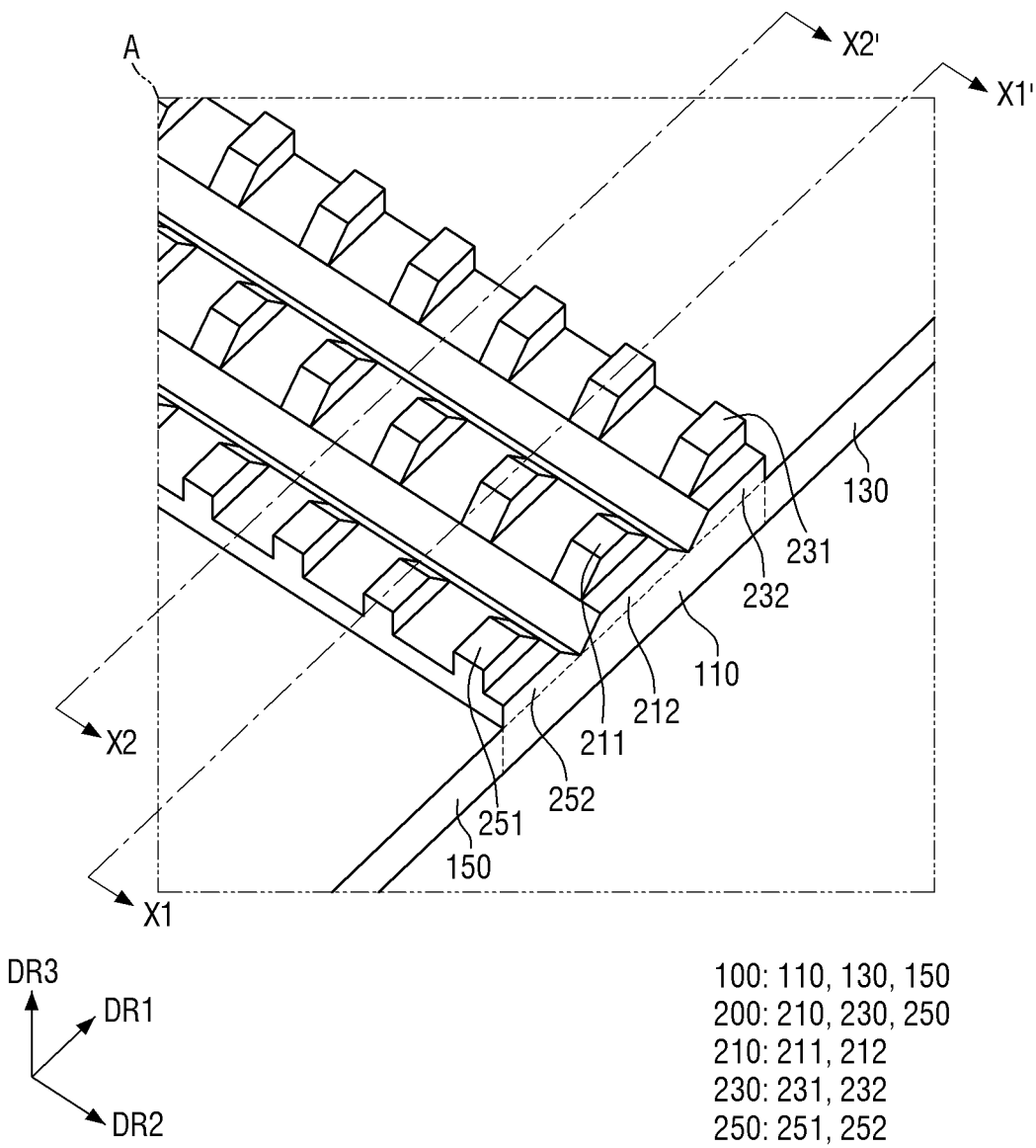
FIG. 2 is an enlarged view of the area A of FIG. 1.
Figure 3:
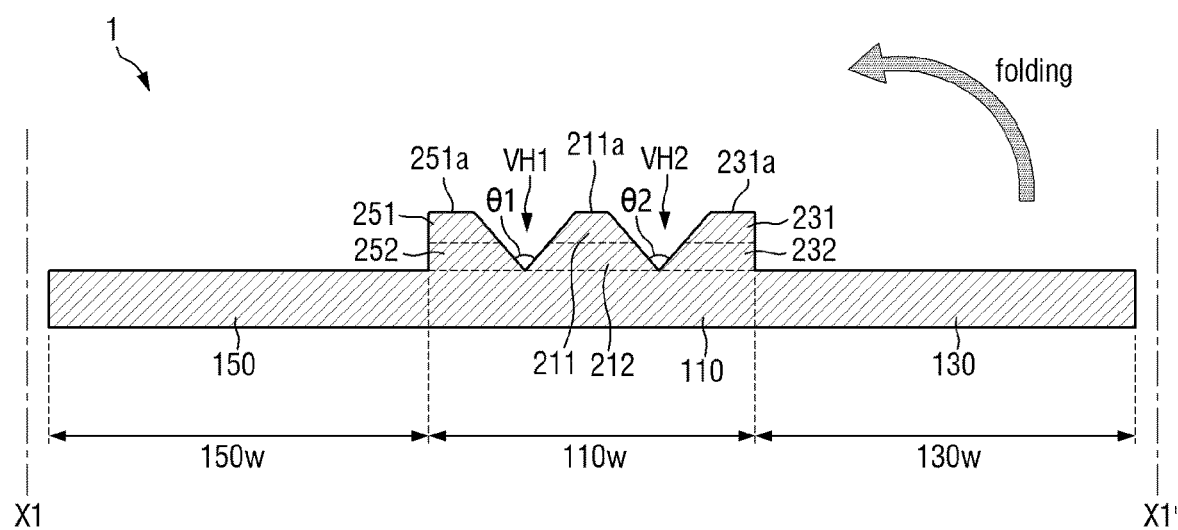
FIG. 3 is a cross-sectional view schematically showing a cross section taken along the line X1-X1' in FIG. 2.
Figure 5:
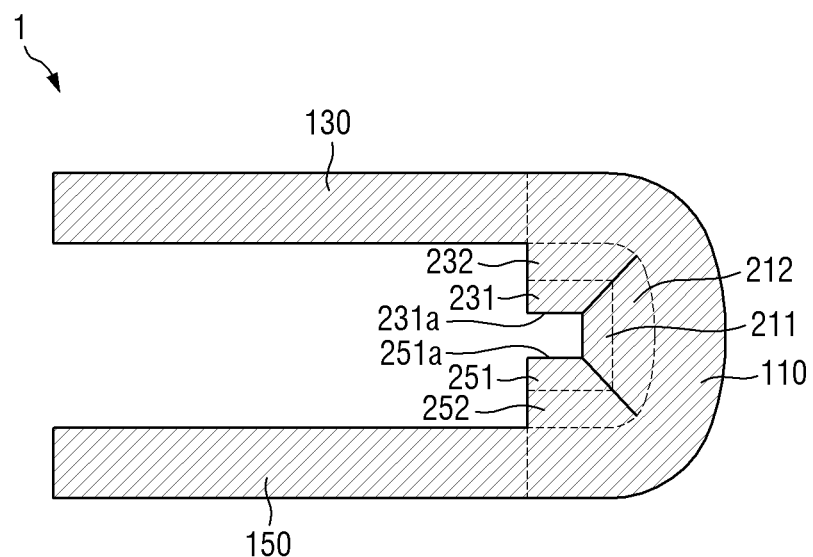
FIG. 5 is a view showing a folded state of the mold for printing a wiring according to the embodiment shown in FIG. 1.

FIG. 1 is a perspective view of a mold for printing a wiring according to an embodiment, FIG. 2 is an enlarged view of the area A of FIG. 1, FIG. 3 is a cross-sectional view schematically showing a cross section taken along the line X1-X1' in FIG. 2, FIG. 4 is a cross-sectional view schematically showing a cross section taken along the line X2-X2' in FIG. 2, and FIG. 5 is a view showing a folded state of the mold for printing a wiring according to the embodiment shown in FIG. 1.

In FIG. 1, the first direction DR1, the second direction DR2, and the third direction DR3 are defined. The first direction DR1 and the second direction DR2 may be perpendicular to each other, the first direction DR1 and the third direction DR3 may be perpendicular to each other, and the second direction DR2 and the third direction DR3 may be perpendicular to each other. The first direction DR1 may refer to a vertical direction in the drawing, the second direction DR2 may refer to a horizontal direction in the drawing, and the third direction DR3 may refer to a direction toward a top or a bottom in the drawing, that is, a thickness direction. As used herein, unless otherwise specified, a "direction" may refer to opposite directions respectively toward both opposing sides along the direction. Further, when the opposite directions respectively toward both opposing sides along the direction are to be distinguished from each other, the opposite directions may include a direction toward one side and a direction toward the other side. In this case, one side and the other side may be referred to one side and the other side along the direction, respectively. Based on FIG. 1, a side to which an arrow points is referred to as one side, and the opposite side thereto is referred to as the other side.

Hereinafter, for convenience of description, in referring to faces of each of members of a mold 1 for printing a wiring, one face facing one side in the third direction DR3 is referred to as a top face, and the other face opposite to one face is referred to as a bottom face. However, the present disclosure is not limited thereto, and one face and the other face of the member may be referred to as a front face and a rear face, respectively, or may be referred to as a first face and a second face, respectively. Further, in describing a relative position of each of the members of the mold 1 for printing a wiring, one side in the third direction DR3 may be referred to as a top side, and the other side in the third direction DR3 may be referred to as a bottom side.

Referring to FIG. 1 to FIG. 5, the mold 1 for printing a wiring according to an embodiment refers to a frame for forming a side-face wiring (see, e.g., SW in FIG. 18) of a display device (see, e.g., DD in FIG. 18) in a process for manufacturing the display device, to be described in more detail later. The mold 1 may transfer the conductive ink (see, e.g., CI in FIG. 16) to a side face of a substrate (see, e.g., SUB in FIG. 6). The mold 1 for printing a wiring may be made of an elastic material and may be bent to cover the side face of the substrate SUB in the process for manufacturing the display device, as described below. In some embodiments, the mold 1 for printing a wiring may include silicon (Si). However, the present disclosure is not limited thereto. The mold 1 for printing a wiring according to an embodiment may include a base 100 and a pattern portion 200.

The base 100 of the mold 1 for printing a wiring may act as a basis of the mold 1 for printing a wiring. The base 100 may have a bendable part 110, a first lever part 130, and a second lever part 150.

The bendable part 110 of the base 100 may be bendable and may be a portion at where a pattern portion 200 to which the conductive ink CI is transferred is disposed in a process for manufacturing a display device to be described later. In some embodiments, the bendable part 110 may have a rectangular parallelepiped shape extending in the second direction DR2. However, the present disclosure is not limited thereto.

The bendable part 110 may be disposed between the first lever part 130 and the second lever part 150. For example, the first lever part 130 may be disposed on one side of the bendable part 110 in the first direction DR1, and the second lever part 150 may be disposed on the other side of the bendable part 110 in the first direction DR1.

The first lever part 130 of the base 100 may be used to bend one side of the bendable part 110 in the first direction DR1. For example, the first lever part 130 may be disposed on one side in the first direction DR1 of the bendable part 110 and may be folded such that one side in the first direction DR1 of the bendable part 110 may be bent, as shown in FIG. 3 to FIG. 5. For example, the first lever part 130 may be folded such that the bendable part 110 may be bent at a second hinge groove VH2 between a first protruding pattern 210 and a second protruding pattern 230 disposed on the bendable part 110, as described below. In some embodiments, the first lever part 130 may have a rectangular parallelepiped shape extending in the second direction DR2. However, the present disclosure is not limited thereto.

The second lever part 150 of the base 100 may be used to bend the other side of the bendable part 110 in the first direction DR1. For example, the second lever part 150 may be disposed on the other side of the bendable part 110 in the first direction DR1 and may be folded such that the other side of the bendable part 110 in the first direction DR1 may be bent as shown in FIG. 3 to FIG. 5. For example, the first lever part 130 may be folded such that the bendable part 110 may be bent at a first hinge groove VH1 between the first protruding pattern 210 and a third protruding pattern 250 disposed on the bendable part 110, as will be described later. In some embodiments, the second lever part 150 may have a rectangular parallelepiped shape extending in the second direction DR2. However, the present disclosure is not limited thereto.

In some embodiments, the bendable part 110, the first lever part 130, and the second lever part 150 may be integrally formed with each other or monolithic with each other. For example, a dimension in the third direction DR3 of the bendable part 110, a dimension in the third direction DR3 of the first lever part 130, and a dimension in the third direction DR3 of the second lever part 150 may be substantially the same as each other, and the bendable part 110, the first lever part 130, and the second lever part 150 may include the same material. However, the present disclosure is not limited thereto. For example, the bendable part 110, the first lever part 130, and the second lever part 150 may include different materials. Hereinafter, for convenience of description, the following description describes an embodiment in which the bendable part 110, the first lever part 130, and the second lever part 150 are integrally formed with each other.

Referring to FIG. 3 to FIG. 5, in one embodiment, a dimension 130w in the first direction DR1 of the first lever part 130 and a dimension 150w in the first direction DR1 of the second lever part 150 may be equal to or larger than a dimension 110w in the first direction DR1 of the bendable part 110. Accordingly, the first lever part 130 and the second lever part 150 may be folded to effectively bend the bendable part 110.

The pattern portion 200 of the mold 1 for printing a wiring may be a portion to which the conductive ink CI is transferred in a process for manufacturing a display device, to be described later. In some embodiments, the pattern portion 200 may be integrally formed with the base 100 and may include the same material as that of the base 100. However, the present disclosure is not limited thereto. For example, in other embodiments, the pattern portion 200 may include a material different from that of the base 100. Hereinafter, for convenience of description, an embodiment in which the pattern portion 200 and the base 100 are integrally formed with each other is described.

The pattern portion 200 may be disposed on the bendable part 110 of the base 100 and may protrude in the third direction DR3. The pattern portion 200 may include the first protruding pattern 210, the second protruding pattern 230, and the third protruding pattern 250 that are spaced apart from each other. For example, the first protruding pattern 210 and the third protruding pattern 250 may be spaced apart from each other with the first hinge groove VH1 disposed therebetween. The first protruding pattern 210 and the second protruding pattern 230 may be spaced apart from each other with the second hinge groove VH2 disposed therebetween. In other words, the first protruding pattern 210 may be disposed between the second protruding pattern 230 and the third protruding pattern 250.

The first protruding pattern 210 of the pattern portion 200 may transfer the conductive ink CI to the side face of the substrate SUB in the process for manufacturing a display device, to be described later. The first protruding pattern 210 may extend in the second direction DR2 along the bendable part 110. The first protruding pattern 210 may include a first protruding portion 212 and a plurality of first protrusions 211.

The first protruding portion 212 of the first protruding pattern 210 may space a portion (e.g., the plurality of first protrusions 211) of the first protruding pattern 210 to which the conductive ink CI is transferred and the bendable part 110 from each other by a spacing (e.g., a predefined spacing) in the third direction DR3.

The first protruding portion 212 may have a shape protruding from a top face of the bendable part 110 toward one side in the third direction DR3. As shown in FIG. 2 to FIG. 4, the first protruding portion 212 may have a trapezoidal cross section in which its width becomes narrower as the first protruding portion 212 extends farther from the top face of the bendable part 110 toward one side in the third direction DR3, and the first protrusion may extend in the second direction DR2. Thus, the first protruding portion 212 may have a hexahedral shape. For example, a top face of the first protruding portion 212 may have a smaller area than a bottom face of the first protruding portion 212. Each of a first side face of the first protruding portion 212 disposed at one side in the first direction DR2 thereof and a second side face of the first protruding portion 212 disposed at the other side in the first direction DR1 may be inclined such that the first protrusion may converge toward one side in the third direction DR3. In a cross-sectional view, the first protruding portion 212 may have a trapezoidal shape with both opposing sides being inclined.

As described above, when the pattern portion 200 and the base 100 are integrally formed with each other, the first protruding portion 212 and the bendable part 110 may also be integrally formed with each other. In some embodiments, the first protruding portion 212 may be in a central area of the bendable part 110. However, the present disclosure is not limited thereto.

The plurality of first protrusions 211 of the first protruding pattern 210 may be a portion to which the conductive ink CI is transferred in a process for manufacturing a display device, to be described later. The plurality of first protrusions 211 may be disposed on a top face of the first protruding portion 212 and may be spaced apart from each other in the second direction DR2.

Each of the plurality of first protrusions 211 may protrude from a top face of the first protruding portion 212 toward one side in the third direction DR3. A width of each of the plurality of first protrusions 211 may narrow as each first protrusion extends toward one side in the third direction DR3. In other words, each of the plurality of first protrusions 211 may have a trapezoidal cross-section in which both opposing sides are inclined.

Each of the plurality of first protrusions 211 may have a first side face disposed at one side in the first direction DR1, a second side face disposed at the other side in the first direction DR1, and a first printing face 211a disposed at one side in the third direction DR3.

An inclination of the first side face of each of the plurality of first protrusions 211 may be substantially equal to an inclination of the first side face of the first protruding portion 212 so that the first side face of each of the first protrusions 211 and the first side face of the first protruding portion 212 are aligned with each other (e.g., are continuous with each other). An inclination of the second side face of each of the plurality of first protrusions 211 may be substantially equal to an inclination of the second side face of the first protruding portion 212 so that the second side face of each of the first protrusions 211 and the second side face of the first protruding portion 212 may be aligned with each other (e.g., may be continuous with each other).

The first printing face 211a of each of the plurality of first protrusions 211 may be a portion to which the conductive ink CI is transferred in a process for manufacturing a display device, to be described later. The first printing face 211a may connect (e.g., may extend between) the first side face and the second side face of each of the plurality of first protrusions 211. The first printing face 211a may print the conductive ink CI onto the side face of the substrate SUB in the process for manufacturing the display device. A description thereof will be described later.

The second protruding pattern 230 of the pattern portion 200 may transfer the conductive ink CI to a top face of the substrate SUB in the process for manufacturing a display device, to be described later. The second protruding pattern 230 may extend in the second direction DR2 along the bendable part 110. The second protruding pattern 230 may include a second protruding portion 232 and a plurality of second protrusions 231.

The second protruding portion 232 of the second protruding pattern 230 may space a portion (e.g., the plurality of second protrusions 231) of the second protruding pattern 230 to which the conductive ink CI is transferred and the bendable part 110 from each other by a spacing (e.g., a predefined spacing) in the third direction DR3. The second protruding portion 232 may space the portion of the second protruding pattern 230 to which the conductive ink CI is transferred and the first lever part 130 from each other by a spacing (e.g., a predefined spacing) in the third direction DR3. Thus, when the mold 1 for printing a wiring according to an embodiment is folded in the process for manufacturing the display device, elements formed on the top face of the substrate SUB may not directly contact the first lever part 130. A detailed description thereof will be provided later.

The second protruding portion 232 may have a shape protruding from the top face of the bendable part 110 to one side in the third direction DR3. As shown in FIG. 2 to FIG. 4, the second protruding portion 232 has a cross sectional shape of a trapezoid in which its width becomes narrower as the second protrusion extends from the top face of the bendable part 110 toward one side in the third direction DR3, and the second protruding portion 232 may extend in the second direction DR2. Thus, the second protruding portion 232 may have a hexahedral shape. In some embodiments, an area of a top face of the second protruding portion 232 is smaller than that of a bottom face of the second protruding portion 232. A first side face of the second protruding portion 232 disposed at the other side in the first direction DR1 may be inclined toward one side in the first direction DR1. For example, in the cross sectional view, the second protruding portion 232 may have a trapezoidal shape with one side face being inclined. However, the cross-sectional shape of the second protruding portion 232 is not limited to the above-described shape. For example, the cross-sectional shape of the second protruding portion 232 may be a trapezoidal shape with both opposing side faces being inclined. Hereinafter, for convenience of description, the following description is based on an example in which the first side face of the second protruding portion 232 is inclined toward one side in the first direction DR1. The first side face of the second protruding portion 232 and the first side face of the first protruding portion 212 may face each other in the first direction DR1.

When the pattern portion 200 and the base 100 are integrally formed with each other, the second protruding portion 232 and the bendable part 110 may also be integrally formed with each other. In some embodiments, the second protruding portion 232 may be located on one side of the bendable part 110 in the first direction DR1. However, the present disclosure is not limited thereto.

The plurality of second protrusions 231 of the second protruding pattern 230 may be a portion to which the conductive ink CI is transferred in a process for manufacturing a display device, to be described later. The plurality of second protrusions 231 may be disposed on a top face of the second protruding portion 232 and may be spaced apart from each other in the second direction DR2.

Each of the plurality of second protrusions 231 may have a shape that protrudes from the top face of the second protruding portion 232 toward one side in the third direction DR3. A width of each second protrusion 231 becomes narrower as the second protrusion extends toward one side in the third direction DR3. In other words, a shape in a cross-sectional view of each of the plurality of second protrusions 231 may be a trapezoidal shape in which at least one side face is inclined.

Each of the plurality of second protrusions 231 may have a first side face disposed at the other side in the first direction DR1, a second side face disposed at one side in the first direction DR1, and a second printing face 231a disposed at one side in the third direction DR3. The first side face of each of the plurality of second protrusions 231 may be inclined toward one side in the first direction DR1.

An inclination of the first side face of each of the plurality of second protrusions 231 may be substantially equal to an inclination of the first side face of the second protruding portion 232 so that the first side face of each of the second protrusion 231 and the first side face of the second protruding portion 232 may be aligned with each other.

The second printing face 231a of each of the plurality of second protrusions 231 may be a portion to which the conductive ink CI is transferred in a process for manufacturing a display device, to be described later. The second printing face 231a may connect the first side face and the second side face of each of the plurality of second protrusions 231 to each other.

The second hinge groove VH2 may be disposed between the first protruding pattern 210 and the second protruding pattern 230. For example, the second protruding portion 232 may be disposed on one side in the first direction DR2 of the first protruding portion 212 and may be spaced apart from the first protruding portion 212 in the first direction DR1 while the second hinge groove VH2 is disposed therebetween.

The second hinge groove VH2 may be defined by the first side face of the first protruding portion 212 and the first side face of the second protruding portion 232. Accordingly, the second hinge groove VH2 may extend in the second direction DR2 and may have a shape in which a width thereof becomes narrower as the second hinge groove extends toward the other side in the third direction DR3. The second hinge groove VH2 may have a 'V' shape in a cross-sectional view (see, e.g., FIG. 3). For example, the first side face of the first protruding portion 212 and the first side face of the second protruding portion 232 defining the second hinge groove VH2 may meet each other at one point. That is, the second hinge groove VH2 may have (or may form) a second angle θ2 defined by the first side face of the first protruding portion 212 and the first side face of the second protruding portion 232 where they meet each other at one point. The second angle θ2 may be approximately 90°.

When the mold 1 for printing a wiring is folded about the second hinge groove VH2, as shown in FIG. 5, the first side face of the first protruding portion 212 and the first side face of the second protruding portion 232 may contact each other so that the second printing face 231a contacts one side of the first printing face 211a and an angle between the first printing face 211a and the second printing face 231a is approximately 90°. Accordingly, the second printing face 231a may print the conductive ink CI onto the top face of the substrate SUB in the process for manufacturing the display device. A description thereof will be described later.

The third protruding pattern 250 of the pattern portion 200 may transfer the conductive ink CI to a bottom face of the substrate SUB in the process for manufacturing a display device, to be described later. The third protruding pattern 250 may extend in the second direction DR2 along the bendable part 110. The third protruding pattern 250 may include a third protruding portion 252 and a plurality of third protrusions 251.

The third protruding portion 252 of the third protruding pattern 250 may space the portion (e.g., the plurality of third protrusions 251) of the third protruding pattern 250 to which the conductive ink CI is transferred and the bendable part 110 from each other by a spacing (e.g., a predefined spacing) in the third direction DR3 and may space the portion of the third protruding pattern 250 to which the conductive ink CI is transferred and the second lever part 150 from each other by a spacing (e.g., a predefined spacing) in the third direction DR3. Thus, when the mold 1 for printing a wiring according to an embodiment is folded in the process for manufacturing the display device, elements formed on the bottom face of the substrate SUB may not come into direct contact with the second lever part 150. A detailed description thereof will be provided later.

The third protruding portion 252 may have a shape protruding from the top face of the bendable part 110 toward one side in the third direction DR3. As shown in FIG. 2 to FIG. 4, the third protruding portion 252 has a shape in the cross-sectional view of a trapezoid in which a width becomes narrower as the third protruding portion 252 extends from the top face of the bendable part 110 toward one side in the third direction DR3, and the third protruding portion 252 extends in the second direction DR2. Thus, the third protruding portion 252 may have a hexahedral shape. In some embodiments, a top face of the third protruding portion 252 has a smaller area than that of a bottom face of the third protruding portion 252. A first side face of the third protruding portion 252 disposed at one side in the first direction DR2 may be inclined toward the other side in the first direction DR1. For example, in the cross-sectional view of the third protruding portion 252, the third protruding portion 252 may have a trapezoidal shape with one side face being inclined. However, the shape cross-sectional shape of the third protruding portion 252 is not limited to the above-described shape. For example, the third protruding portion 252 may have a trapezoidal shape with both opposing side faces being inclined. Hereinafter, for convenience of description, the following description will be based on an example in which the first side face of the third protruding portion 252 is inclined toward the other side in the first direction DR1. The first side face of the third protruding portion 252 and the second side face of the first protruding portion 212 may face each other in the first direction DR1.

When the pattern portion 200 and the base 100 are integrally formed with each other, the third protruding portion 252 and the bendable part 110 may also be integrally formed with each other. In some embodiments, the third protruding portion 252 may be located on the other side in the first direction DR1 of the bendable part 110. However, the present disclosure is not limited thereto.

The plurality of third protrusions 251 of the third protruding pattern 250 may be a portion to which the conductive ink CI is transferred in a process for manufacturing a display device, to be described later. The plurality of third protrusions 251 may be disposed on the top face of the third protruding portion 252 and may be spaced apart from each other in the second direction DR2.

Each of the plurality of third protrusions 251 may have a shape that protrudes from a top face of the third protruding portion 252 toward one side in the third direction DR3. A width of the third protrusion 251 becomes narrower as the third protrusion 251 extends toward one side in the third direction DR3. For example, the shape in the cross-sectional view of each of the plurality of third protrusions 251 may be a trapezoidal shape in which at least one side is inclined.

Each of the plurality of third protrusions 251 may have a first side face disposed at one side in the first direction DR1, a second side face disposed at one side in the first direction DR1 and a third printing face 251a disposed at the other side in the third direction DR3. The first side face of each of the plurality of third protrusions 251 may be inclined toward the other side in the first direction DR1.

An inclination of the first side face of each of the plurality of third protrusions 251 may be substantially equal to an inclination of the first side face of the third protruding portion 252 so that the first side face of each of the third protrusions 251 and the first side face of the third protruding portion 252 may be aligned with (e.g., may mirror) each other.

The third printing face 251a of each of the plurality of third protrusions 251 may be a portion to which the conductive ink CI is transferred in a process for manufacturing a display device, to be described later. The third printing face 251a may connect (e.g., may extend between) the first side face and the second side face of each of the plurality of third protrusions 251.

The first hinge groove VH1 may be disposed between the first protruding pattern 210 and the third protruding pattern 250. For example, the third protruding portion 252 may be disposed on the other side of the first protruding portion 212 in the first direction DR1 and may be spaced apart from the first protruding portion 212 in the first direction DR1 with the first hinge groove VH1 disposed therebetween.

The first hinge groove VH1 may be defined by the second side face of the first protruding portion 212 and the first side face of the third protruding portion 252. Accordingly, the first hinge groove VH1 extends in the second direction DR2 and may have a shape in which its width becomes narrower as the groove VH1 extends toward the other side in the third direction DR3. The first hinge groove VH1 may have a 'V' shape in a cross-sectional view. For example, the second side face of the first protruding portion 212 and the first side face of the third protruding portion 252 defining the first hinge groove VH1 may meet each other at one point. That is, the first hinge groove VH1 may form a first angle θ1 defined at where the second side face of the first protruding portion 212 and the first side face of the third protruding portion 252 meet each other at one point. The first angle θ1 may be approximately 90°.

When the mold 1 for printing a wiring is folded about the first hinge groove VH1, the second side face of the first protruding portion 212 and the first side face of the third protruding portion 252 may contact each other as shown in FIG. 5 and the third printing face 251a may contact the other side of the first printing face 211a such that an approximately 90° angle is defined between the third printing face 251a and the first printing face 211a. Accordingly, the third printing face 251a may print the conductive ink CI onto the bottom face of the substrate SUB in the process for manufacturing the display device. A description thereof will be described later.

Hereinafter, the substrate SUB used in the process for manufacturing the display device and various elements disposed on the substrate SUB will be described.

Figure 6:
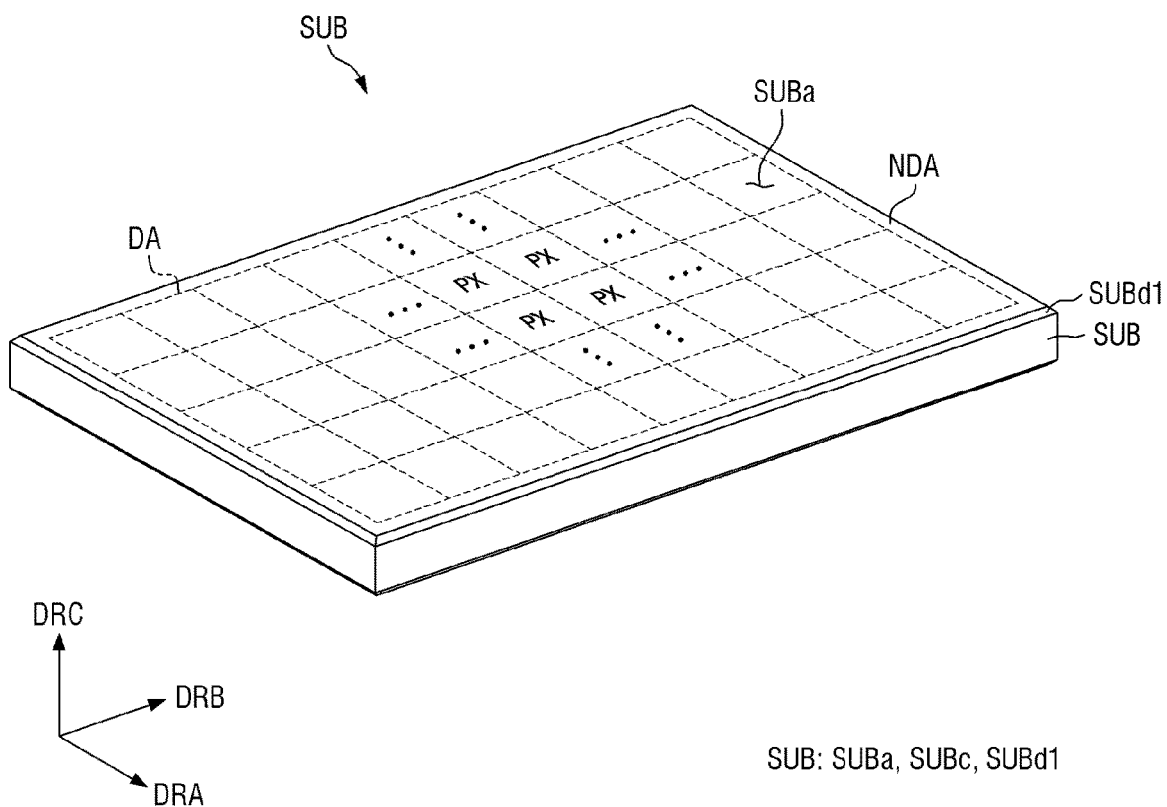
FIG. 6 is a perspective view showing a top face of a substrate of a display device according to an embodiment.
Figure 7:
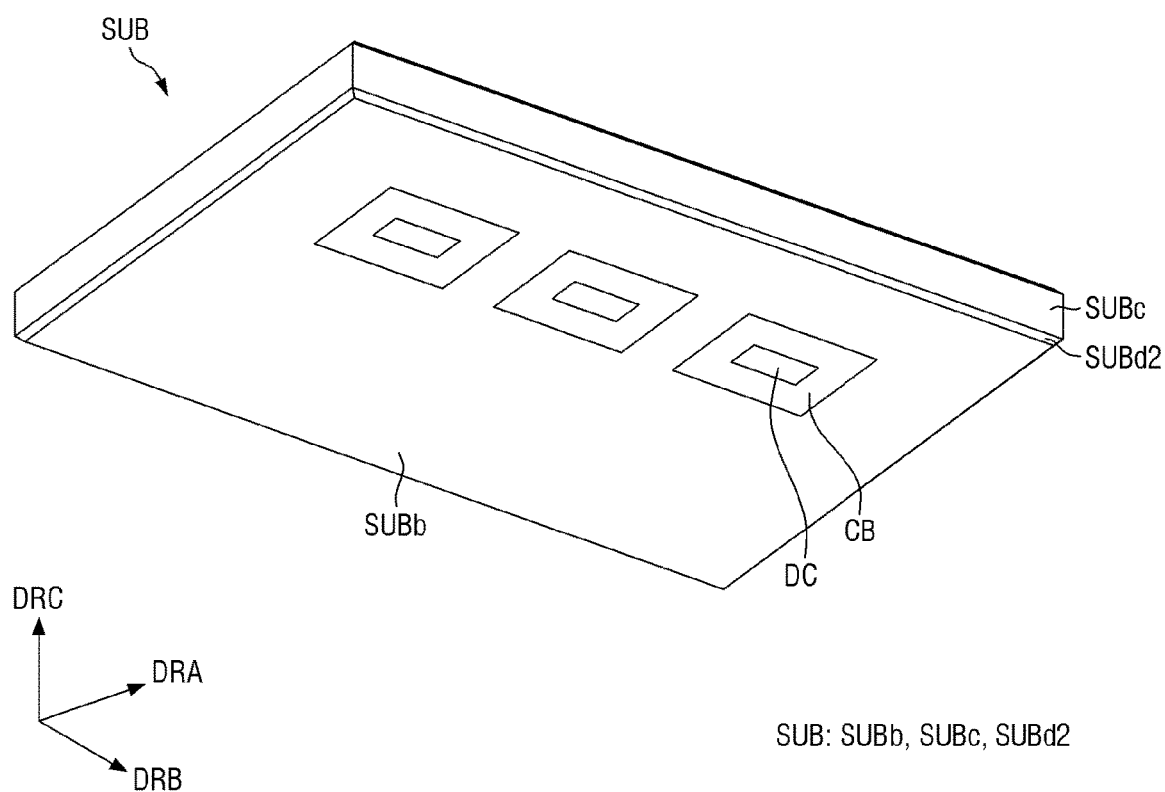
FIG. 7 is a perspective view showing a bottom face of the substrate shown in FIG. 6.

FIG. 6 is a perspective view showing a top face of the substrate of the display device according to an embodiment, and FIG. 7 is a perspective view showing a bottom face of the substrate shown in FIG. 6.

In FIG. 6, A direction DRA, B direction DRB, and C direction DRC are defined. The A direction DRA and the B direction DRB may be perpendicular to each other, the A direction DRA and the C direction DRC may be perpendicular to each other, and the B direction DRB and the C direction DRC may be perpendicular to each other. The A direction DRA is a vertical direction in the drawing, and the B direction DRB is a horizontal direction in the drawing. The C direction DRC may refer to a direction toward a top or a bottom in the drawing, that is, a thickness direction. As used herein, unless otherwise specified, a "direction" may refer to opposite directions respectively toward both opposing sides along the direction. Further, when the opposite directions are to be distinguished respectively toward both opposing sides along the direction from each other, the opposite directions may include a direction toward one side and a direction toward the other side. In this case, one side and the other side may be referred to one side and the other side along the direction, respectively. Based on FIG. 6, a side to which an arrow points is referred to as one side, and the opposite side thereto is referred to as the other side.

Hereinafter, for convenience of description, in referring to faces of each of members of the substrate SUB, one face facing one side in the C direction DRC is referred to as a top face, and the other face opposite to one face is referred to as a bottom face. However, the present disclosure is not limited thereto, and one face and the other face of the member may be referred to as a front face and a rear face, respectively, or may be referred to as a first face SUBa and a second face SUBb, respectively. Further, in describing a relative position of each of the members of the mold 1 for printing a wiring, one side in the C direction DRC may be referred to as a top and the other side in C direction DRC may be referred to as a bottom.

The substrate SUB may serve as a basis of the display device DD which will be described later. In some embodiments, the substrate SUB may include a rigid substrate SUB having rigidity and made of glass. However, the present disclosure is not limited thereto. For example, the substrate SUB may be a flexible substrate SUB made of polyimide. Hereinafter, for the convenience of description, an example in which the substrate SUB is a rigid substrate SUB made of the glass will be described.

The substrate SUB may have a three-dimensional shape similar to a cuboid and may have a shape in which an edge between a bottom face and each of side faces constituting the cuboid and an edge between a bottom face and each of side faces constituting the cuboid are chamfered. For example, the substrate SUB may have a three-dimensional shape similar to a cuboid and may have a shape in which an edge of each of the bottom face and the bottom face thereof is chamfered. FIGS. 6 and 7 illustrate that a chamfered face is formed at each of both opposing sides in the A-direction DRA and each of both opposing sides in the B-direction DRB of each of the top face and the bottom face of the substrate SUB. In some embodiments, the chamfered face may be formed at each of both opposing sides in the A-direction DRA and each of both opposing sides in the B-direction DRB of each of the top face and the bottom face of the substrate SUB. However, the present disclosure is not limited thereto. For example, the chamfered face may be formed only at one side in the A direction DRA of each of the top face and the bottom face of the substrate SUB, or the chamfered face may be omitted. Hereinafter, for convenience of description, following description describes an example in which the chamfered face is formed at each of both opposing sides in the A-direction DRA and each of both opposing sides in the B-direction DRB of each of the top face and the bottom face of the substrate SUB.

The substrate SUB may have the first face SUBa, the second face SUBb, a plurality of chamfered faces, and a plurality of side faces.

The first face SUBa may be a top face of the substrate SUB. The first face SUBa may have a rectangular shape having a short-side extending in the A-direction DRA and a long-side extending in the B-direction DRB.

The second face SUBb may be a face opposite to the first face SUBa in the third direction DRC. The second face SUBb may be a bottom face of the substrate SUB. The second face SUBb may have a rectangular shape having a short-side extending in the A-direction DRA and a long-side extending in the B-direction DRB.

The plurality of side faces may be disposed between (e.g., may extend between) the first face SUBa and the second face SUBb and may include both opposing side faces in the A direction DRA and both opposing side faces in the B direction DRB of the substrate SUB. For convenience of description, a side face disposed at one side in the A direction DRA from among the plurality of side faces is referred to as 'a first side face SUBc', and a side face disposed at one side in the B direction DRB from among the plurality of side faces is referred to as 'a second side face'. A side face disposed at the other side in the A direction DRA is referred to as 'a third side face', and a side face disposed at the other side in the B direction DRB is referred to as 'a fourth side face'

The plurality of chamfered faces may be disposed between the first face SUBa and each of the plurality of side faces and between the second face SUBb and each of the plurality of side faces to prevent chipping defects from occurring at a plurality of side-face wirings SW. The chamfered face refers to an inclinedly cut (or rounded) face. Due to the plurality of chamfered faces, an angle at which each of the plurality of side-face wirings SW is bent may be reduced (e.g., may be gentle), and thus, the plurality of side-face wirings SW may not chip or crack. For convenience of description, a chamfered face disposed between the first face SUBa and the first side face SUBc from among the plurality of chamfered faces is referred to as 'a first chamfered face SUBd1', and a chamfered face disposed between the second face SUBb and the first side face SUBc from among the plurality of chamfered faces is referred to as 'a second chamfered face SUBd2'. A chamfered face disposed between the first face SUBa and the second side face is referred to as 'a third chamfered face', and a chamfered face disposed between the second face SUBb and the second side face is referred to as 'a fourth chamfered face'. A chamfered face disposed between the first face SUBa and the third side face is referred to as 'a fifth chamfered face', and a chamfered face disposed between the second face SUBb and the third side face is referred to as 'a sixth chamfered face'. A chamfered face disposed between the first face SUBa and the fourth side face is referred to as 'a seventh chamfered face', and a chamfered face disposed between the second face SUBb and the fourth side face is referred to as 'an eighth chamfered face'.

The first chamfered face SUBd1 extends from one side in the A direction DRA of the first face SUBa. The second chamfered face SUBd2 extends from one side in the A direction DRA of the second face SUBb. The first side face SUBc may connect (e.g., may extend between) the first chamfered face SUBd1 and the second chamfered face SUBd2. The third chamfered face extends from one side in the B direction DRB of the first face SUBa. The fourth chamfered face extends from one side in the B direction DRB of the second face SUBb. The second side face may connect the third chamfered face and the fourth chamfered face to each other. The fifth chamfered face extends from the other side in the A direction DRA of the first face SUBa. The sixth chamfered face extends from the other side in the A direction DRA of the second face SUBb. The third side face may connect the fifth chamfered face and the sixth chamfered face to each other. The seventh chamfered face extends from the other side in the B direction DRB of the first face SUBa. The eighth chamfered face extends from the other side in the B direction DRB of the second face SUBb. The fourth side face may connect the seventh chamfered face and the eighth chamfered face to each other.

A plurality of pixels PX may be disposed on the first face SUBa of the substrate SUB and may display an image. The plurality of pixels PX may be arranged in a matrix form in the A direction DRA and the B direction DRB.

The plurality of pixels PX may emit light (e.g., may be configured to emit light) and display an image. The plurality of pixels PX may be disposed on one area of the first face SUBa of the substrate SUB overlapping a display area DA. The plurality of pixels PX may be arranged in a grid pattern in the display area DA. Each of the plurality of pixels PX may include a light-emitting element emitting light and a thin-film transistor for controlling the light-emitting element. The light-emitting element may be any kind of a light-emitting element. For example, the light-emitting element may include an organic light-emitting diode including an organic light-emitting layer made of organic material, a quantum dot light-emitting diode including a quantum dot light-emitting layer, an inorganic light-emitting diode including an inorganic semiconductor, or an ultra-small light-emitting diode (e.g., a micro LED).

Circuit boards CB may be disposed on the second face SUBb of the substrate SUB. The circuit board CB may include a flexible printed circuit board, a printed circuit board, or a flexible film such as chip on film (COF).

A display driving circuit DC may generate data voltages and may supply the data voltages to data lines extending from the plurality of pixels PX. The display driving circuit DC may be embodied as an integrated circuit (IC) and may be attached to the circuit board CB. In some embodiments, the display driving circuit DC may be directly attached to the second face SUBb of the substrate SUB in a COG (chip on glass) manner.

As described above, the side-face wiring SW is formed to apply an electric signal from the circuit board CB or the display driving circuit DC to the plurality of pixels PX.

Hereinafter, a process of manufacturing a display device DD including forming the side-face wiring SW on the side face of the substrate SUB by using the mold 1 for printing a wiring according to an embodiment will be described.

FIG. 8 to FIG. 17 are diagrams describing a process of manufacturing a display device using a mold for printing a wiring according to an embodiment.

Figure 8:
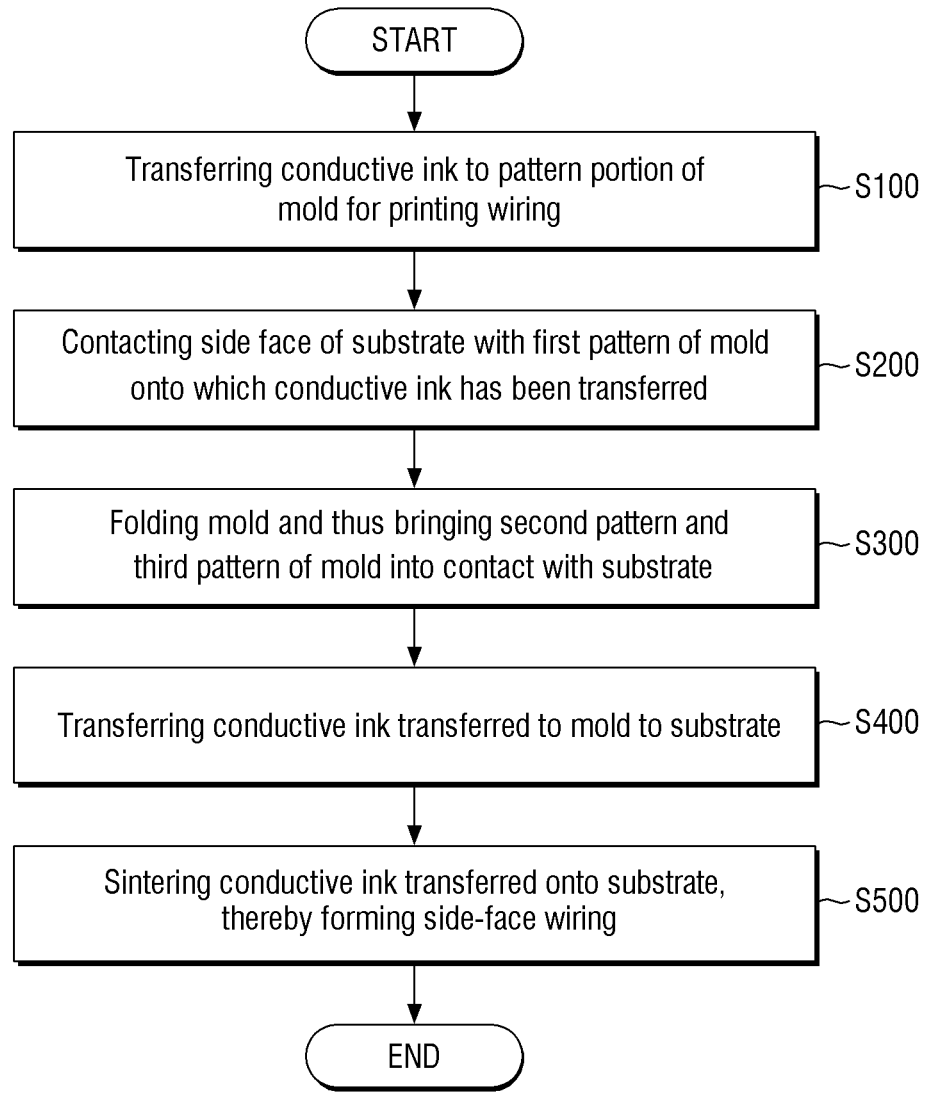
FIG. 8 to FIG. 17 describe a process of manufacturing a display device using a mold for printing a wiring according to an embodiment.

Referring to FIG. 8, the process of manufacturing the display device DD by using the mold 1 for printing a wiring according to an embodiment may include a step S100 of transferring the conductive ink CI to the pattern portion 200 of the mold 1 for printing a wiring; a step S200 of contacting the side face of the substrate SUB with the first pattern of the mold 1 for printing a wiring onto which the conductive ink CI has been transferred; a step S300 of bending (or folding) the mold 1 for printing a wiring to bring the second pattern and the third pattern of the mold 1 for printing a wiring into contact with the substrate SUB; a step S400 of transferring the conductive ink CI transferred to the mold 1 for wiring printing to the substrate SUB; and a step S500 of sintering the conductive ink CI transferred onto the substrate SUB, thereby forming the side-face wiring SW.

Figure 9:
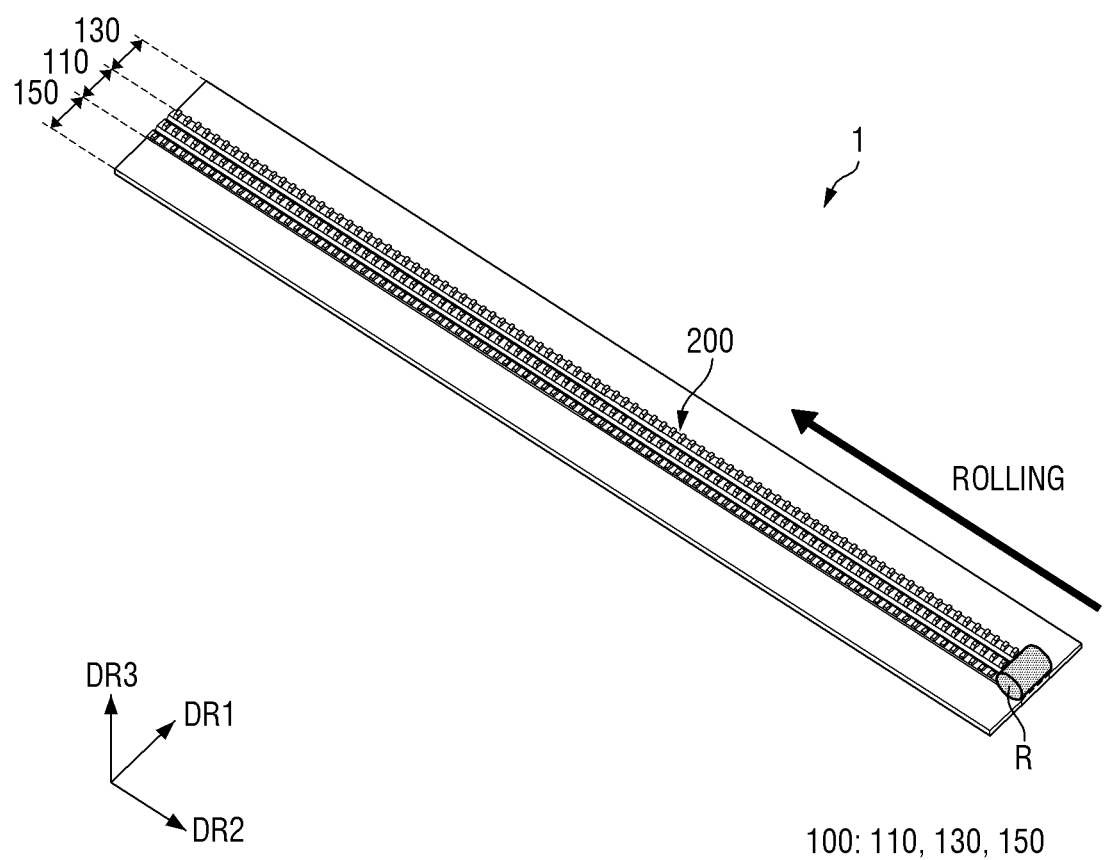
Figure 10:
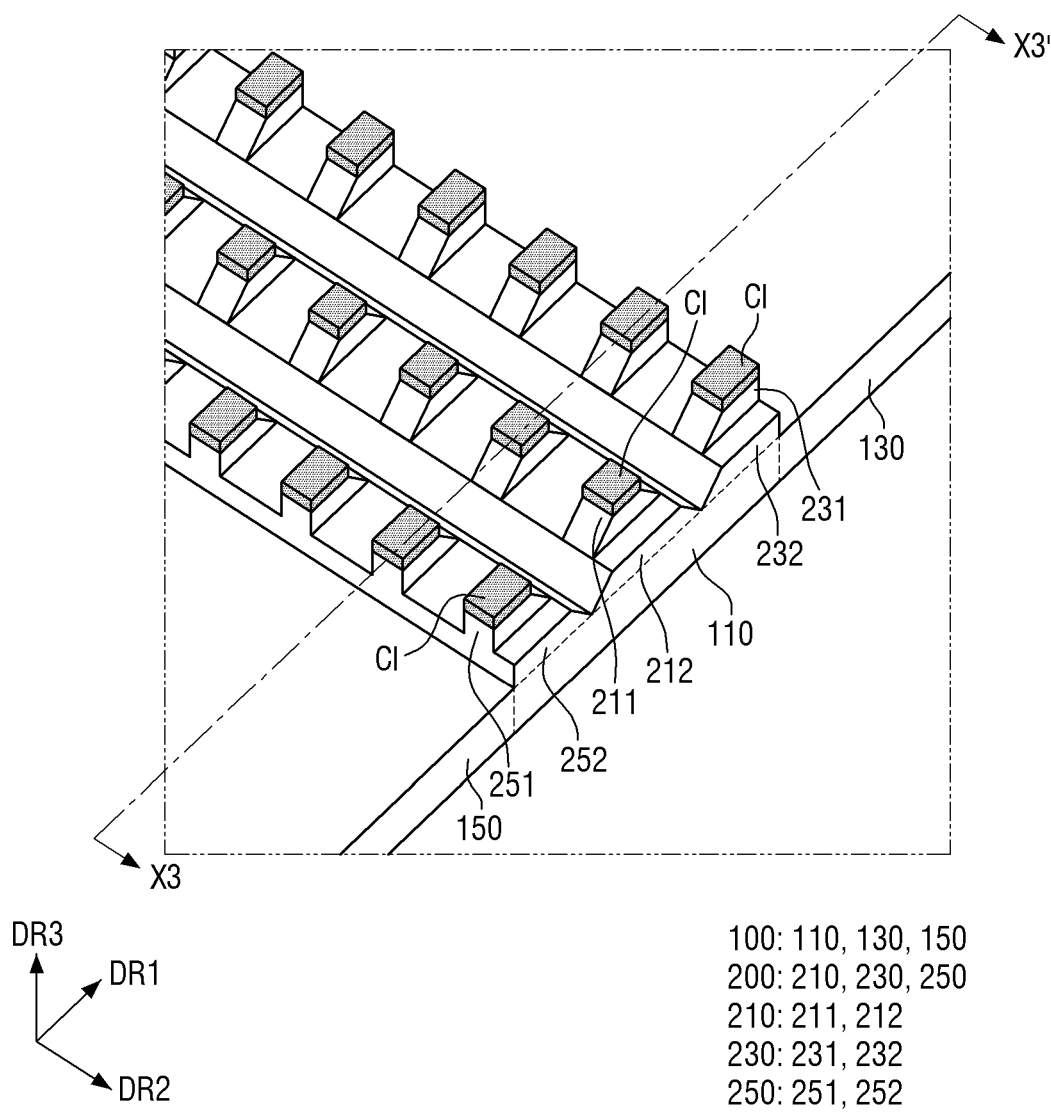
Figure 11:
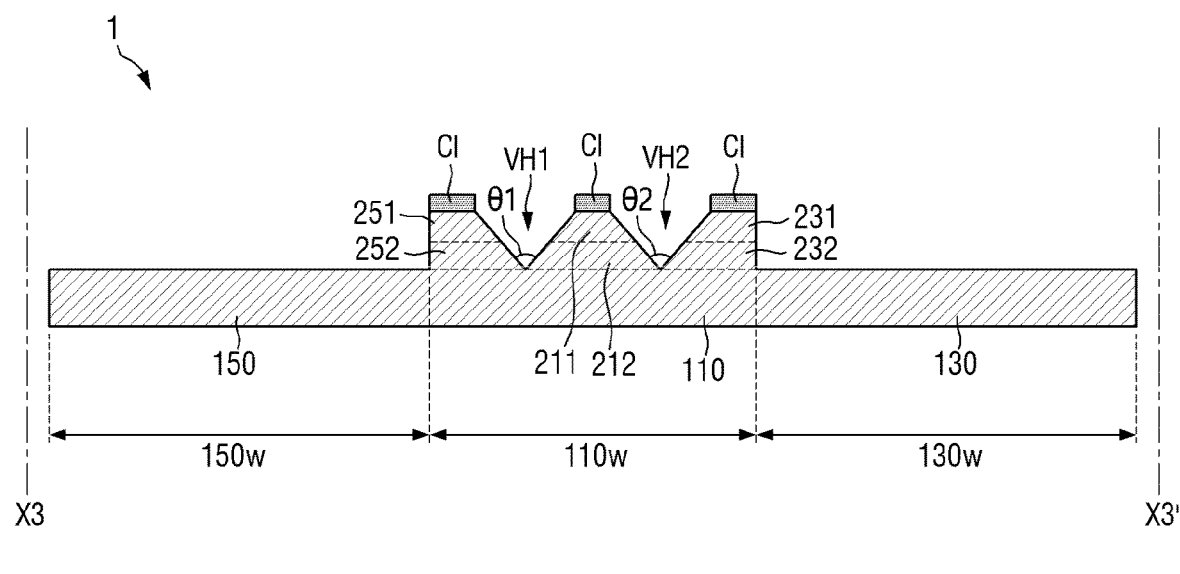

First, referring to FIG. 9 to FIG. 11, the conductive ink CI is transferred to the pattern portion 200 of the mold 1 for printing a wiring according to an embodiment in step S100. In the process of transferring the conductive ink CI to the pattern portion 200, the conductive ink CI may be transferred to the pattern portion 200 by, for example, rolling a roller R having the conductive ink CI coated thereon on along the pattern portion 200. The conductive ink CI may include a conductive material, such as silver (Ag).

The roller R may be rolled on and along all of the first protruding pattern 210, the second protruding pattern 230, and the third protruding pattern 250 such that the conductive ink CI may be transferred to and disposed on each of the first printing face 211a, the second printing face 231a, and the third printing face 251a of the mold 1 for printing a wiring. Because the roller R is in contact with the first printing face 211a of the first protruding pattern 210, the second printing face 231a of the second protruding pattern 230, and the third printing face 251a of the third protruding pattern 250 and does not contact the remaining portion of the mold 1, an amount of the ink used to form the side-face wiring SW may be reduced or minimized.

Figure 12:
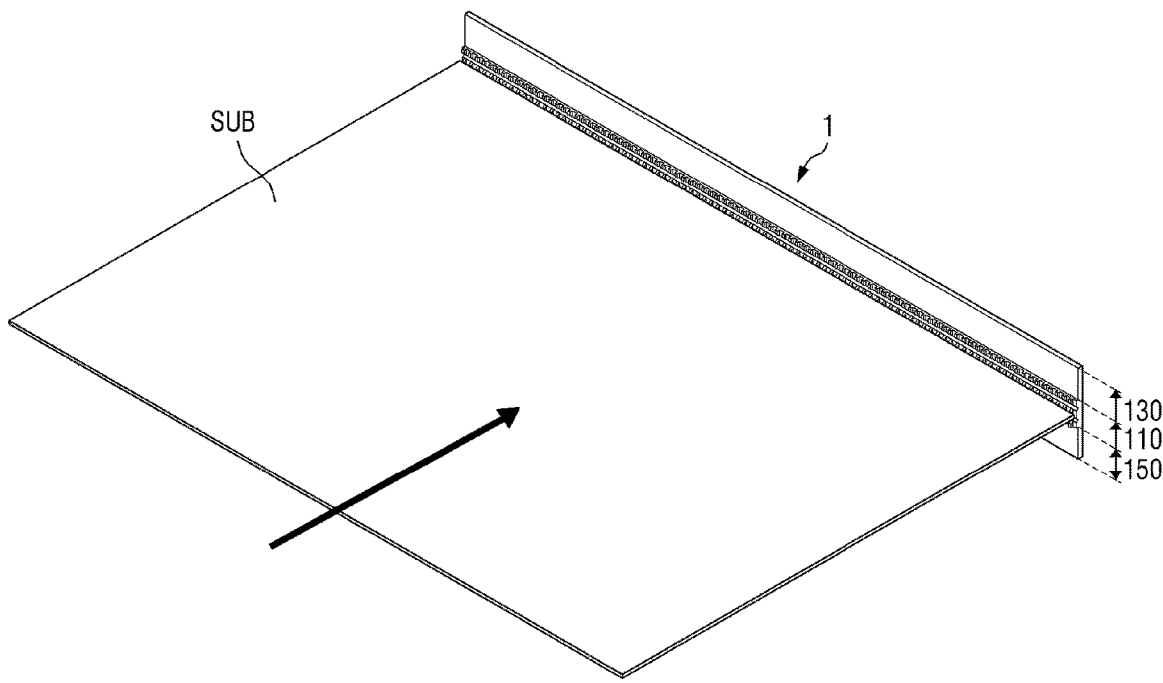
Figure 13:
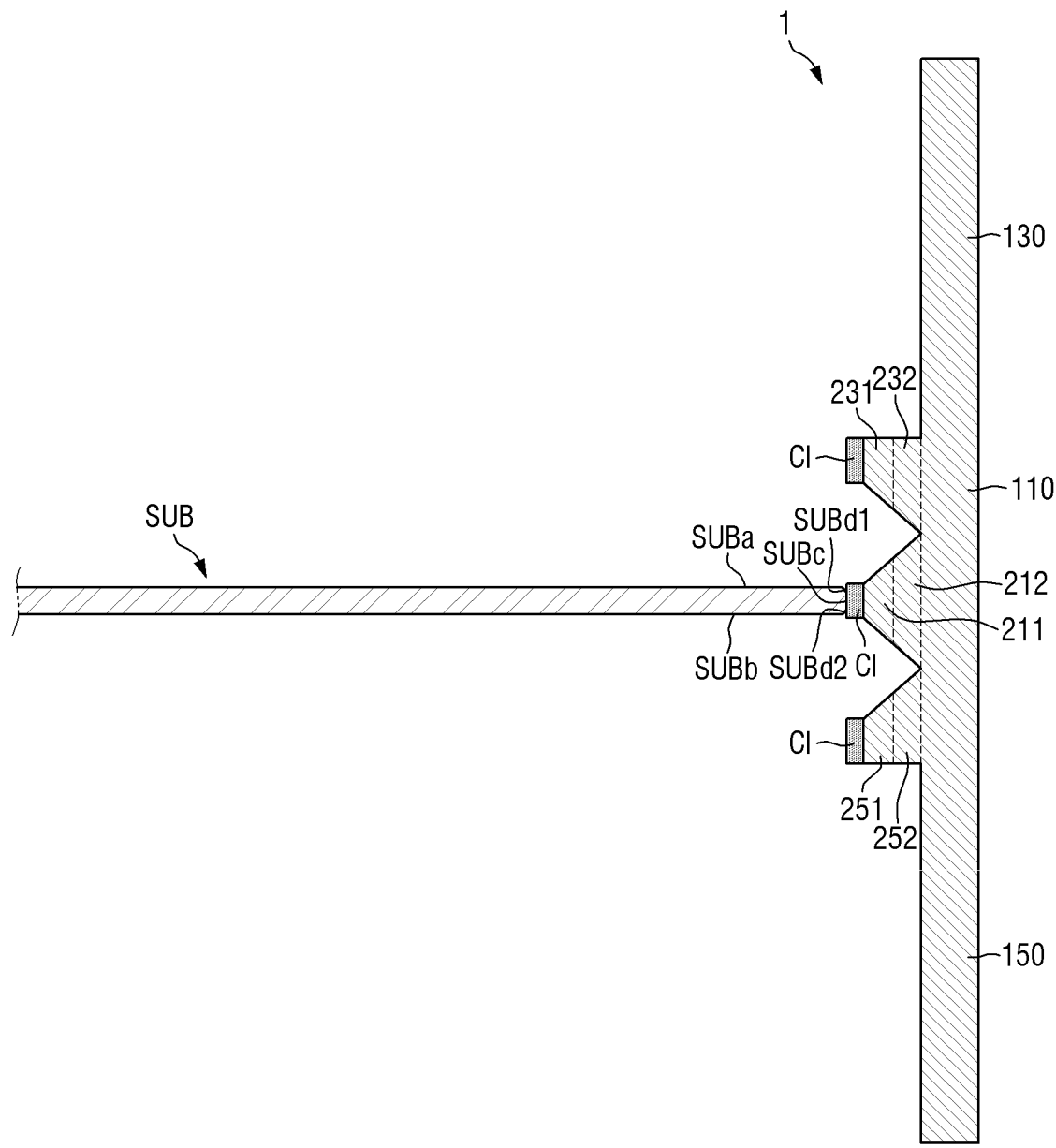

Then, referring to FIG. 12 and FIG. 13, the side face of the substrate SUB may be brought into contact with the first protruding pattern 210 of the mold 1 for printing a wiring to which conductive ink CI has been transferred in step S200. For example, the side face of the substrate SUB may be brought into contact with the first protruding pattern 210 of the mold 1 for printing a wiring in a state in which the mold 1 for printing a wiring is not folded.

In this state, the conductive ink CI on the first printing face 211a of the first protruding pattern 210 may be in direct contact with the first side face SUBc of the substrate SUB. The conductive ink CI on the second printing face 231a of the second protruding pattern 230 may not come into contact with the top face of the substrate SUB because the mold 1 for printing a wiring is not folded. Similarly, the conductive ink CI on the third printing face 251a of the third protruding pattern 250 may not come into contact with the bottom face of the substrate SUB because the mold 1 for printing a wiring is not folded.

Figure 14:
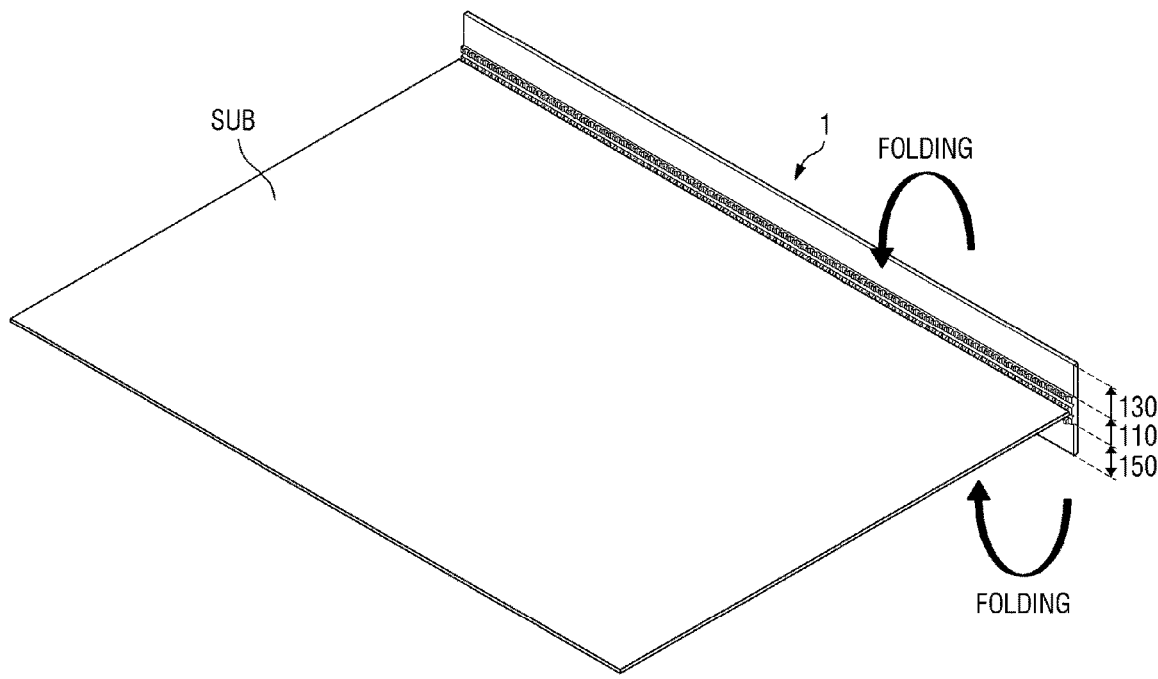
Figure 15:
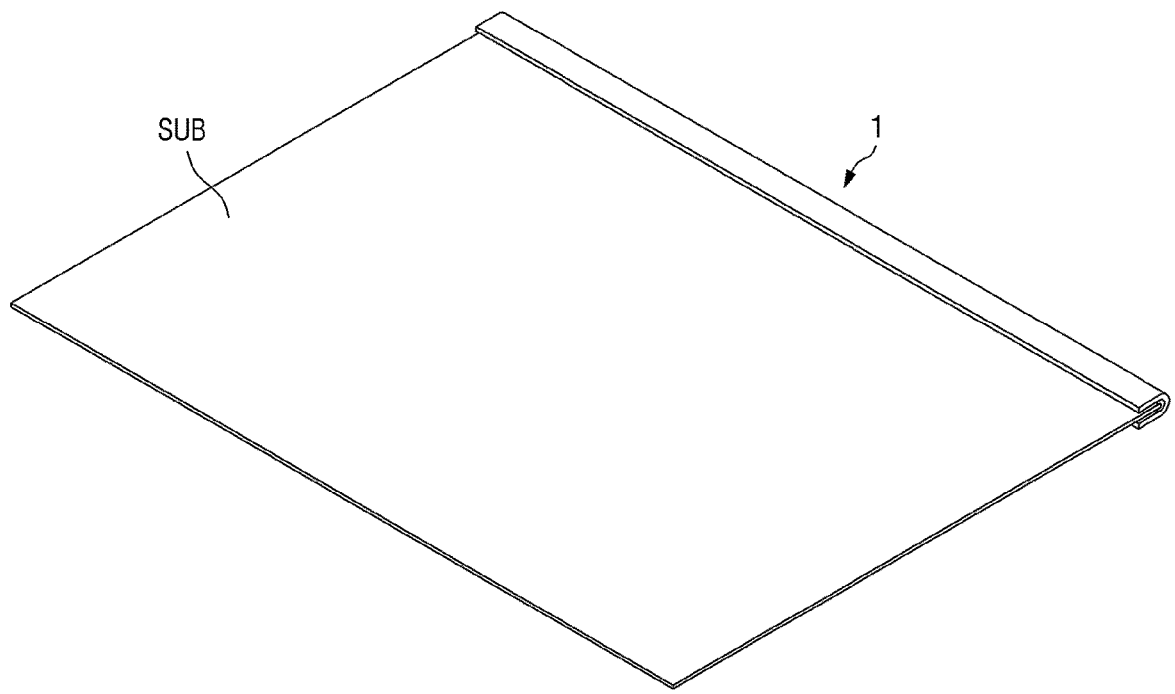
Figure 16:
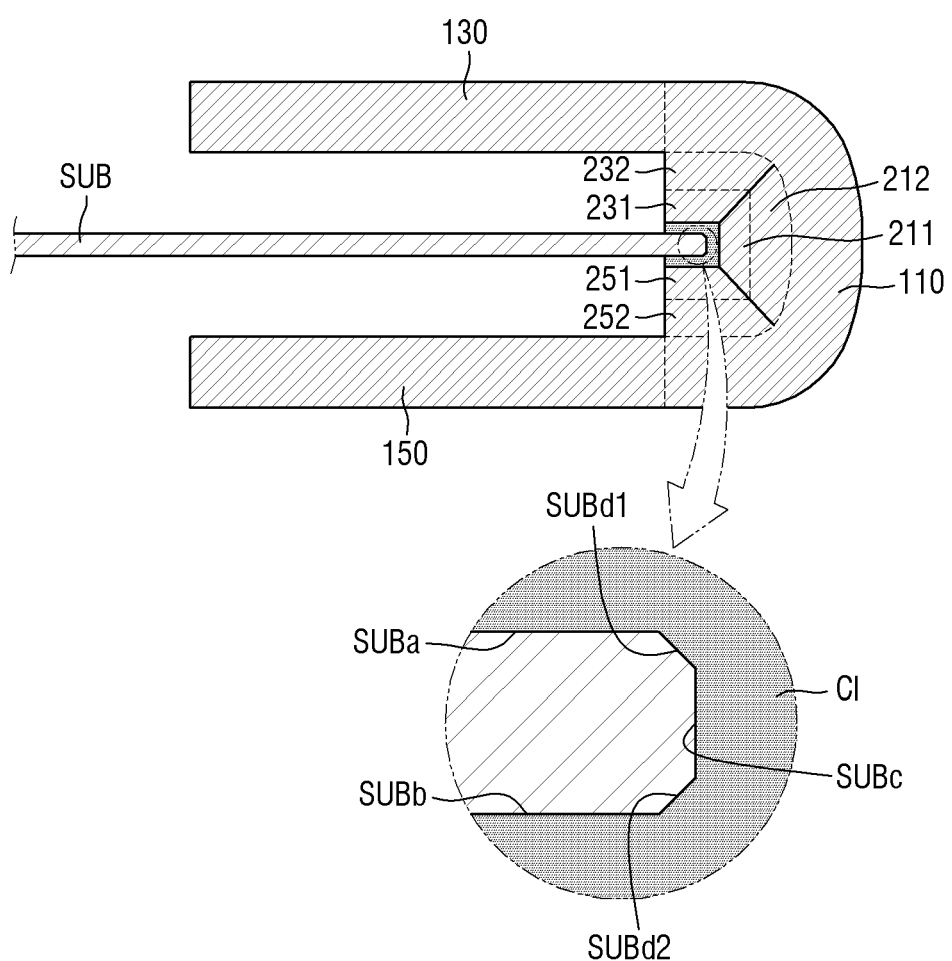

Then, referring to FIG. 14 and FIG. 16, the mold 1 for printing a wiring may be folded such that the second protruding pattern 230 and the third protruding pattern 250 contact the top face and the bottom face of the substrate SUB, respectively, to transfer the conductive ink CI to the top face and the bottom face of the substrate SUB in step S400. A process of folding the mold 1 for printing a wiring may be performed by folding the first lever part 130 and the second lever part 150 of the mold 1 for printing a wiring.

When each of the first lever part 130 and the second lever part 150 is folded, the first side face of the first protruding portion 212 and the first side face of the second protruding portion 232 are in direct contact with each other, and the second side face of the first protruding portion 212 and the first side face of the third protruding portion 252 are in direct contact with each other. Thus, the second printing face 231a of the second protruding pattern 230 faces the first face SUBa of the substrate SUB and the third printing face 251a of the third protruding pattern 250 faces the second face SUBb of the substrate SUB. Accordingly, the conductive ink CI disposed on the second printing face 231a may be transferred onto the first face SUBa of the substrate SUB, and the conductive ink CI disposed on the third printing face 251a may be transferred onto the second face SUBb of the substrate SUB.

In one example, the mold 1 for printing a wiring may include an elastic material as described above and may be easily folded. When the mold 1 for printing a wiring is folded, the conductive ink CI disposed on the first printing face 211a, the conductive ink CI disposed on the second printing face 231a, and the conductive ink CI disposed on the third printing face 251a may contact each other and may be continuous with each other. Thus, the conductive ink CI may also be transferred onto the first chamfered face SUBd1 and the second chamfered face SUBd2.

Accordingly, the conductive ink CI may be first transferred from the roller R to the mold 1 for printing a wiring. Then, the conductive ink CI may be transferred from the mold 1 onto the side face of the substrate SUB. Thus, the transfer process may be simplified.

Figure 17:

Then, referring to FIG. 17, the mold 1 for wiring printing may be removed and then the conductive ink CI transferred to the side face of the substrate SUB may be sintered to form the side-face wiring SW. A process of sintering the conductive ink CI may be performed by using, for example, laser.

Accordingly, conductive particles in the conductive ink CI may be closely adhered and agglomerated with each other so that specific resistance thereof may be lowered.

Hereinafter, the display device DD manufactured by forming the side-face wiring SW on the side face of the substrate SUB by using the mold 1 for printing a wiring according to an embodiment will be described.

Figure 18:
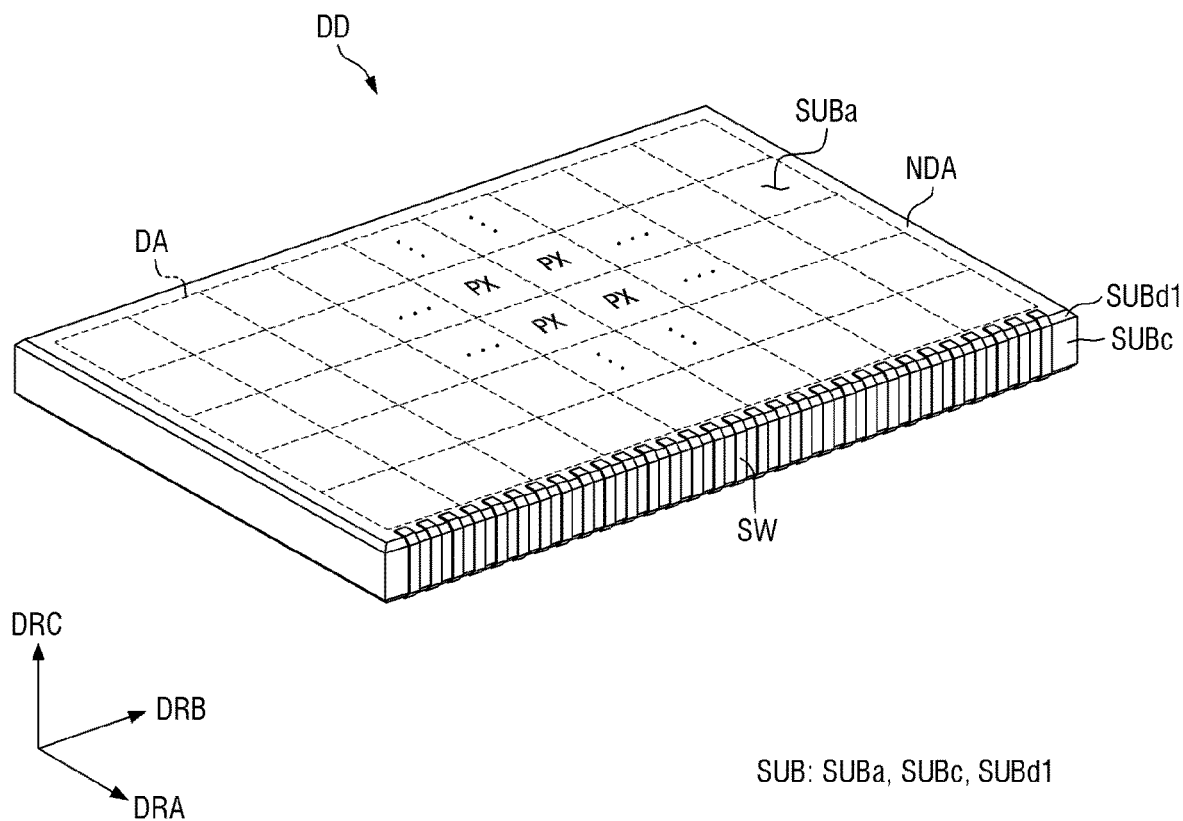
FIG. 18 is a perspective view showing a top face of a display device according to an embodiment.
Figure 19:
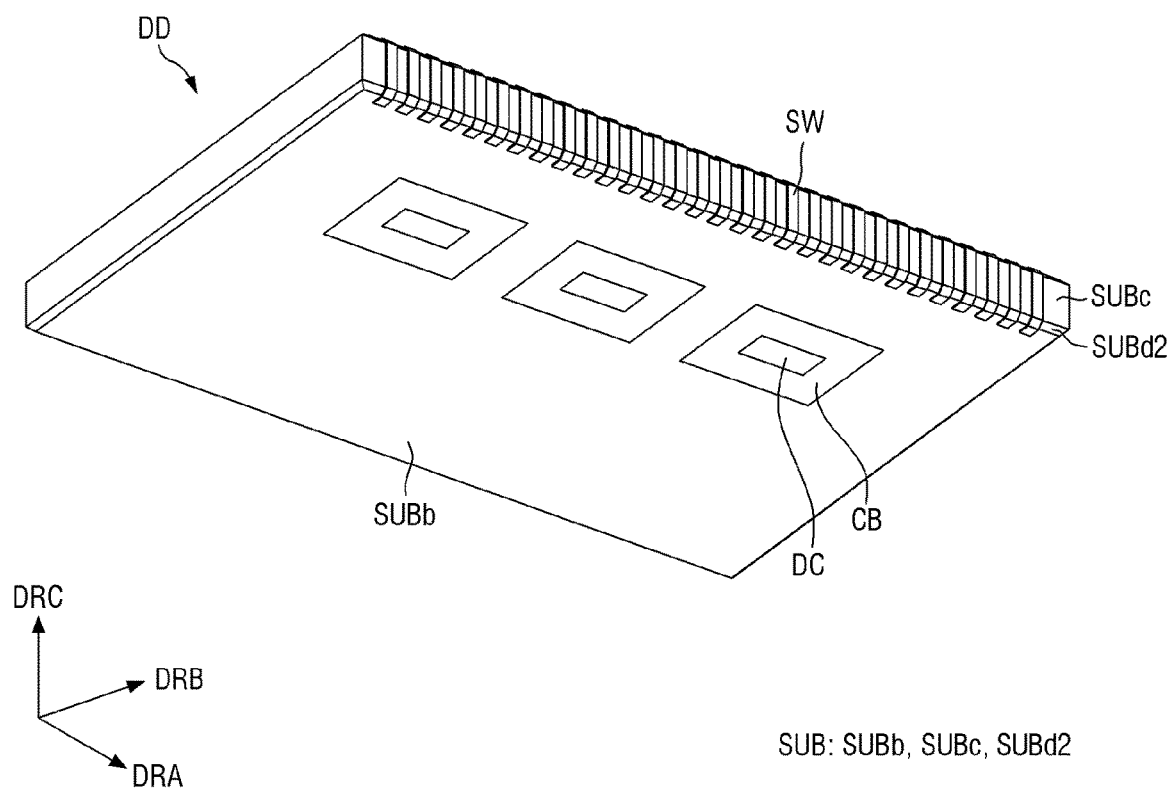
FIG. 19 is a perspective view showing a bottom face of the display device according to the embodiment shown in FIG. 18.
Figure 20:
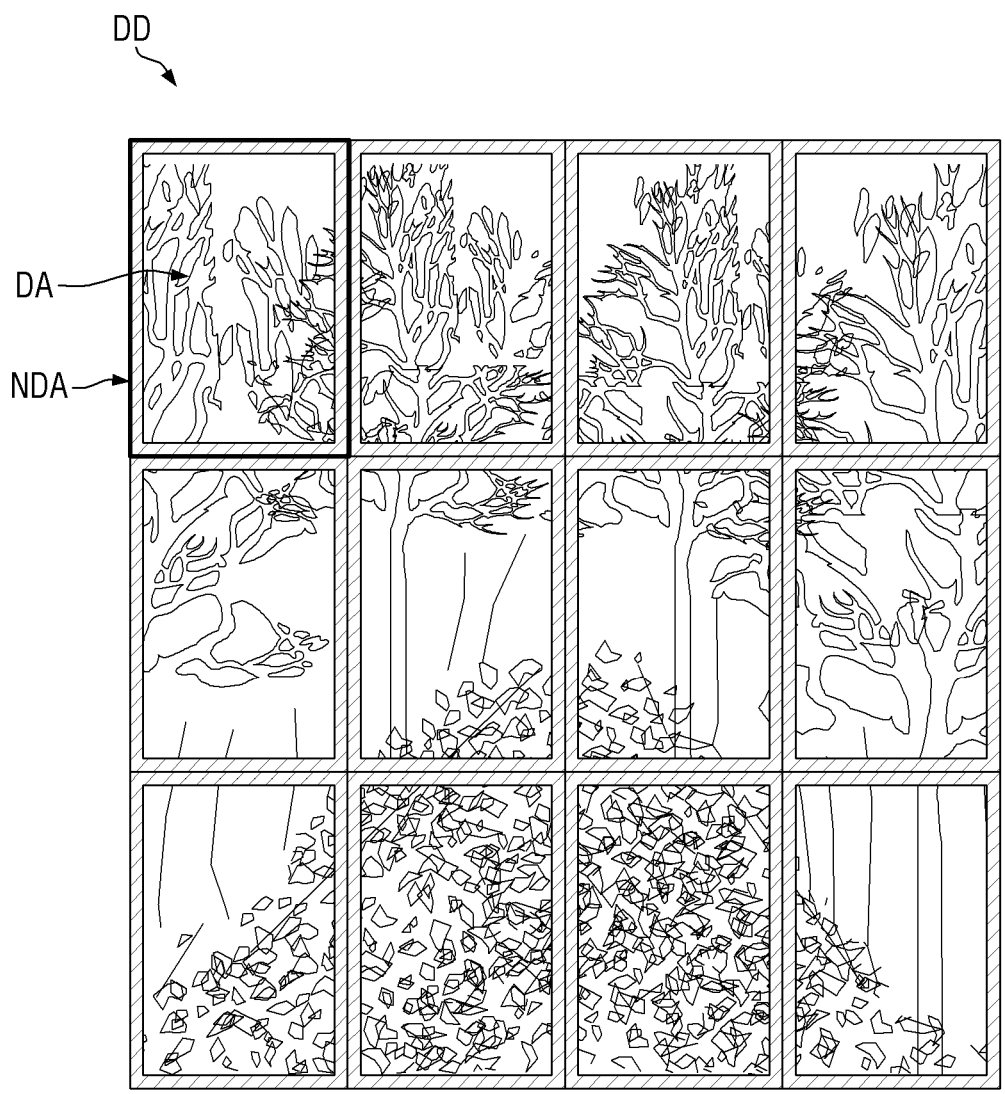
FIG. 20 is a view showing a tile-type display including the display device according to the embodiment shown in FIG. 18.

FIG. 18 is a perspective view showing a top face of a display device according to an embodiment, FIG. 19 is a perspective view showing a bottom face of the display device according to an embodiment shown in FIG. 18, and FIG. 20 is a view showing a tile-type display including the display device according to an embodiment shown in FIG. 18 and FIG. 19.

The A-direction DRA, the B-direction DRB, and the C-direction DRC defined in FIGS. 6 and 7 may be the same in FIG. 18 and FIG. 19. Therefore, the description thereof will be omitted.

Referring to FIG. 18 and FIG. 19, the display device DD according to an embodiment may be applied to portable electronic devices, such as a mobile phone, a smart phone, a tablet PC (tablet personal computer), a mobile communication terminal, an electronic notebook, an e-book, PMP (portable multimedia player), a navigation device, UMPC (Ultra Mobile PC), etc. However, the display device DD according to an embodiment may be applied to a display of a television, a laptop computer, a monitor, a billboard, or the Internet of Things (IoT) device.

The display device DD may be formed in a flat structure having a shape similar to a rectangle. For example, the display device DD may have a flat structure similar to a rectangle having a short-side extending in the A-direction DRA and a long-side extending in the B-direction DRB as shown in FIG. 18. A corner at where the short-side extending in the A-direction DRA and the long-side extending in the B-direction DRB meet each other may be rounded to have a curvature (e.g., a predetermined curvature) or may be formed at a right angle. The shape of the flat structure of the display device DD is not limited to a quadrangle and may be similar to other polygons, a circle, or an oval.

The display device DD has the display area DA in which the image is displayed on one side face (hereinafter, referred to as 'top face') in the C direction DRC face and a non-display area NDA where the image is not displayed as an area other than the display area DA. For example, the non-display area NDA may include a portion of the top face of the display device DD, both opposing side faces in the B direction DRB of the display device DD, both opposing side faces in the A direction DRA, and the other side face in the C direction DRC. However, the present disclosure is not limited thereto. In some embodiments, the non-display area NDA may be disposed to surround (or extend around) an edge of the display area DA. However, the present disclosure is not limited thereto. In one example, the display area DA and the non-display area NDA of the display device DD may also be applied to the substrate SUB, which will be described later.

The display device DD according to an embodiment may include the substrate SUB, the plurality of pixels PX, the plurality of side-face wirings SW, and a driver. The driver may include the circuit board CB and the display driving circuit DC.

The plurality of side-face wirings SW connects the plurality of pixels PX disposed on the first face SUBa of the substrate SUB to the circuit board CB and the display driving circuit DC disposed on the second face SUBb of the substrate SUB. The plurality of side-face wirings SW may be spaced apart from each other in the B direction DRB.

The plurality of side-face wirings SW may be disposed on the first face SUBa, the second face SUBb, at least two chamfered faces of the plurality of chamfered faces, and at least one side face of the plurality of side faces. For example, the plurality of side-face wirings SW may be disposed on the first face SUBa, the second face SUBb, the first chamfered face SUBd1, the second chamfered face SUBd2 and the first side face SUBc to connect first pads disposed at one side in the A direction DRA of the first face SUBa of the substrate SUB to second pads disposed at one side in the A direction DRA of the second face SUBb thereof, as shown in FIG. 1 and FIG. 2. A detailed description of a shape of each of the plurality of side-face wirings SW will be described later.

In some embodiments, the plurality of side-face wirings SW may be disposed only at one side in the A direction DRA of the substrate SUB. However, the present disclosure is not limited thereto. For example, the plurality of side-face wirings SW may be disposed at the other side in the A direction DRA of the substrate SUB, one side in the B direction DRB, or the other side in the B direction DRB of the substrate SUB. Hereinafter, for convenience of description, the following description describes an example in which the plurality of side-face wirings SW are disposed only at one side in the A direction DRA of the substrate SUB.

As described above, a flexible film bent along the side face of the substrate SUB may be omitted when the plurality of side-face wirings SW are used. Thus, a bezel-less display device DD with a minimal non-display area NDA may be provided.

Referring to FIG. 20, a plurality of display devices DD according to an embodiment are coupled to each other and arranged in a grid pattern to form a tile-type display TD for providing a large screen. In this case, the display device DD according to an embodiment may act as one cell of the tile-type display TD and may display a portion of an image to be displayed on the tile-type display TD. Thus, the non-display area NDA needs to be reduced or minimized to avoid or reduce visible discontinuities in the image. According to the configuration as described above, the display device DD according to an embodiment may minimize the non-display area NDA of the top face thereof.

Hereinafter, another embodiment of the mold 1 for printing a wiring will be described. In the following embodiment, the same reference numerals refer to the same components as in the previously described embodiment. Thus, duplicate descriptions will be omitted or simplified and following description will focus on differences therebetween.

Figure 21:
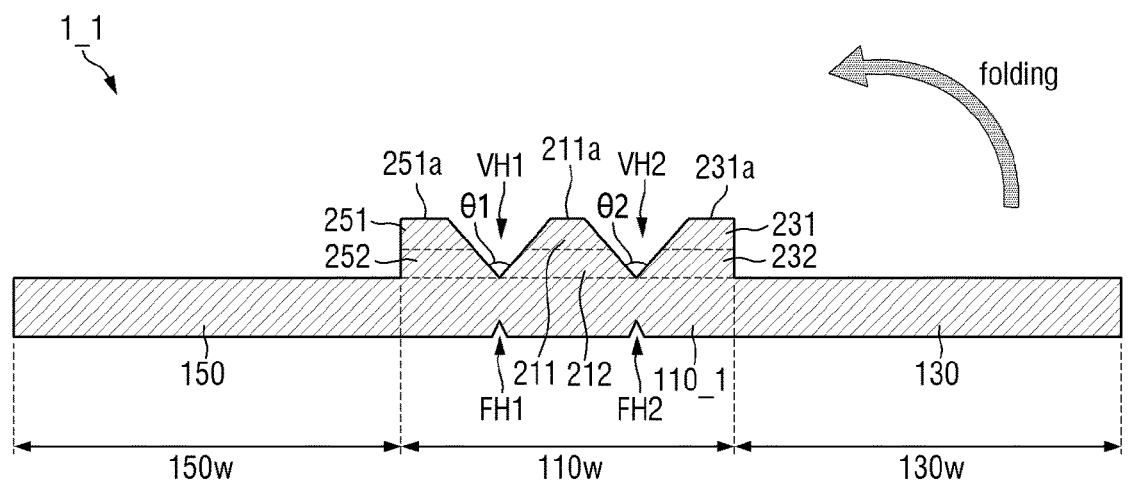
FIG. 21 is a diagram showing a structure of a mold for printing a wiring according to another embodiment.

FIG. 21 is a diagram showing a structure of a mold for printing a wiring according to another embodiment, and FIG. 22 is a view showing the mold for printing a wiring according to the embodiment shown in FIG. 21 in a folded state.

Referring to FIG. 21 and FIG. 22, in a mold 1_1 for printing a wiring according to an embodiment, folding-assisting grooves FH1 and FH2 may be formed on (or in) a bottom face of a bendable part 110_1. The folding-assisting groove may be recessed from the bottom face of the bendable part 110_1.

The folding-assisting groove may allow the mold 1_1 for printing a wiring to be more easily folded. The folding-assisting groove may include a first folding-assisting groove FH1 overlapping the first hinge groove VH1 in the third direction DR3 and a second folding-assisting groove FH2 overlapping the second hinge groove VH2 in the third direction DR3.

When the mold 1_1 for printing a wiring is folded, strain due to bending of the bendable part 110_1 may be concentrated at an area overlapping the first hinge groove VH1 and an area overlapping the second hinge groove VH2 of the bendable part 110_1. Thus, the mold 1_1 may be damaged. When the first folding-assisting groove FH1 overlapping the first hinge groove VH1 in the third direction DR3 and the second folding-assisting groove FH2 overlapping the second hinge groove VH2 in the third direction DR3 are formed, the strain due to the bending of the bendable part 110_1 may not be concentrated at the area overlapping the first hinge groove VH1 and the area overlapping the second hinge groove VH2 of the bendable part 110. Thus, the mold 1_1 for printing a wiring may be more easily folded.

FIG. 23 is a diagram showing a structure of a mold for printing a wiring according to another embodiment, and FIG. 24 is a view showing the mold for printing a wiring according to the embodiment shown in FIG. 23 in a folded state.

Referring to FIG. 23 and FIG. 24, in a mold 1_2 for printing a wiring according to an embodiment, the number of protruding patterns may be increased. For example, in the mold 1_2 for printing a wiring according to an embodiment, a pattern portion 200_2 may further include a fourth protruding pattern 220_2 disposed between the first protruding pattern 210_2 and the second protruding pattern 230_2 and a fifth protruding pattern 240_2 disposed between the first protruding pattern 210_2 and the third protruding pattern 250_2.

The first protruding pattern 210_2 and the fourth protruding pattern 220_2 are spaced apart from each other with a second hinge groove VH2_2 interposed therebetween. The fourth protruding pattern 220_2 and the second protruding pattern 230_2 are spaced apart from each other with a third hinge groove VH3_2 interposed therebetween. The first protruding pattern 210_2 and the fifth protruding pattern 240_2 are spaced apart from each other with a first hinge groove VH1_2 interposed therebetween. The fifth protruding pattern 240_2 and the third protruding pattern 250_2 are spaced apart from each other with a fourth hinge groove VH4_2 interposed therebetween. The first hinge groove VH1_2 may form a first angle θ1_2, a second hinge groove VH2_2 may form a second angle θ2_2, the third hinge groove VH3_2 may form a third angle θ3_2, and the fourth hinge groove VH4_2 may form a fourth angle θ4_2. Each of the first angle θ1_2, the second angle θ2_2, the third angle θ3_2, and the fourth angle θ4_2 may form an angle of approximately 60°. Descriptions of the third hinge groove VH3_2 and the fourth hinge groove VH4_2 are substantially the same as the descriptions of the first hinge groove VH1_2 and the second hinge groove VH2_2 above. Thus, detailed descriptions thereof will be omitted.

The first protruding pattern 210_2 includes a first protruding portion 212_2 and a plurality of first protrusions 211_2. The second protruding pattern 230_2 includes a second protruding portion 232_2 and a plurality of second protrusions 231_2. The third protruding pattern 250_2 includes a third protruding portion 252_2 and a plurality of third protrusions 251_2. The fourth protruding pattern 220_2 includes a fourth protruding portion 221_2 and a plurality of fourth protrusions 222_2. The fifth protruding pattern 240_2 includes a fifth protruding portion 241_2 and a plurality of fifth protrusions 242_2. Descriptions of the fourth protruding portion 221_2, the plurality of fourth protrusions 222_2, the fifth protruding portion 241_2, and the plurality of fifth protrusions 242_2 are substantially the same as the descriptions of the first protruding portion 212_2 and the plurality of first protrusions 211_2 above. Thus, the detailed description thereof may be omitted.

The mold 1_2 for printing a wiring according to an embodiment may be curved in a corresponding manner to the first face SUBa, the first chamfered face SUBd1, the first side face SUBc, the second chamfered face SUBd2 and the second face SUBb of the substrate SUB as described above. Accordingly, a process of forming the side-face wiring SW on the side face of the substrate SUB may be more easily performed.

In concluding the detailed description, those skilled in the art will appreciate that many variations and modifications can be made to the embodiments described herein without substantially departing from the present disclosure. Therefore, the disclosed embodiments of the present disclosure are used in a generic and descriptive sense and not for purposes of limitation.

What is claimed is:

1. A mold for printing a wiring, the mold comprising:
   a first lever part;
   a second lever part spaced from the first lever part;
   a bendable part between the first lever part and the second lever part;
   a first protruding portion protruding from a top face of the bendable part in a thickness direction of the mold;
   a second protruding portion protruding from the top face of the bendable part in the thickness direction and at one side of the first protruding portion; and
   a third protruding portion protruding from the top face of the bendable part in the thickness direction and at the other side of the first protruding portion,
   wherein the first protruding portion and the second protruding portion are spaced apart from each other with a first hinge groove therebetween,
   wherein the first protruding portion and the third protruding portion are spaced apart from each other with a second hinge groove therebetween, and
   wherein a width of each of the first hinge groove and the second hinge groove increases as each of the first hinge groove and the second hinge groove extends upwardly in the thickness direction.

2. The mold of claim 1, wherein the first hinge groove is defined by a first side face of the first protruding portion and a first side face of the second protruding portion,
   wherein the second hinge groove is defined by a second side face of the first protruding portion and a first side face of the third protruding portions,
   wherein the first side face of the first protruding portion and the first side face of the second protruding portion face each other, and
   wherein the second side face of the first protruding portion and the first side face of the third protruding portion face each other.

3. The mold of claim 2, wherein the second protruding portion is adjacent to the first lever part,
   wherein the third protruding portion is adjacent to the second lever part,
   wherein the first lever part is configured to be folded so that the first side face of the first protruding portion and the first side face of the second protruding portion directly contact each other, and
   wherein the second lever part is configured to be folded so that the second side face of the first protruding portion and the first side face of the third protruding portion directly contact each other.

4. The mold of claim 3, wherein each of the first protruding portion, the second protruding portion, the third protruding portion, the first hinge groove, and the second hinge groove extends in a first direction crossing the thickness direction,
wherein a plurality of first protrusions protruding from the first protruding portion in the thickness direction are on the first protruding portion and are spaced apart from each other in the first direction,
wherein a plurality of second protrusions protruding from the second protruding portion in the thickness direction are on the second protruding portion and are spaced apart from each other in the first direction, and
wherein a plurality of third protrusions protruding from the third protruding portion in the thickness direction are on the third protruding portion and are spaced apart from each other in the first direction.

5. The mold of claim 4, wherein a first side face of each of the plurality of first protrusions faces a first side face of each of the plurality of second protrusions,
wherein a second side face of each of the plurality of first protrusions faces a first side face of each of the plurality of third protrusions,
wherein the first side face of each of the plurality of first protrusions is aligned with the first side face of the first protruding portion,
wherein the second side face of each of the plurality of first protrusions is aligned with the second side face of the first protruding portion,
wherein the first side face of each of the plurality of second protrusions is aligned with the first side face of the second protruding portion, and
wherein the first side face of each of the plurality of third protrusions is aligned with the first side face of the third protruding portion.

6. The mold of claim 5, wherein each of the plurality of first protrusions has a first printing face as a top face thereof in the thickness direction,
wherein each of the plurality of second protrusions has a second printing face as a top face thereof in the thickness direction,
wherein each of the plurality of third protrusions has a third printing face as a top face thereof in the thickness direction, and
wherein the first lever part and the second lever part are configured to be folded so that one side of the first printing face and the second printing face contact each other and the other side of the first printing face and the third printing face contact each other.

7. The mold of claim 1, wherein the first lever part, the second lever part, and the bendable part are integrally formed with each other and comprise an elastic material.

8. The mold of claim 7, wherein the bendable part, the first protruding portion, the second protruding portion, and the third protruding portion are integrally formed with each other and comprise the elastic material.

9. The mold of claim 8, wherein each of a length of the first lever part and a length of the second lever part is greater than a length of the bendable part.

10. The mold of claim 1, wherein the bendable part has a folding-assisting groove recessed from a bottom face of the bendable part, and
wherein a width of the folding-assisting groove narrows as the folding-assisting groove extends in the thickness direction.

11. The mold of claim 10, wherein the folding-assisting groove comprises:
a first folding-assisting groove overlapping the first hinge groove in the thickness direction; and
a second folding-assisting groove overlapping the second hinge groove in the thickness direction.

12. A mold for printing a wiring, the mold comprising:
a first lever part;
a second lever part spaced from the first lever part;
a bendable part between the first lever part and the second lever part;
a first protruding portion protruding from the bendable part in a thickness direction of the mold;
a second protruding portion protruding from the bendable part in the thickness direction, the second protruding portion being at one side of the first protruding portion in a first direction and spaced from the first protruding portion in the first direction, the first direction crossing the thickness direction; and
a third protruding portion protruding from the bendable part in the thickness direction, the third protruding portion being at the other side of the first protruding portion in the first direction and spaced from the first protruding portion in the first direction,
wherein each of a width of the first protruding portion, a width of the second protruding portion, and a width of the third protruding portion narrows as each of the first to third protruding portions extends in the thickness direction.

13. The mold of claim 12, wherein a first side face of the first protruding portion and a first side face of the second protruding portion face each other,
wherein a second side face of the first protruding portion and a first side face of the third protruding portion face each other,
wherein the second protruding portion is adjacent to the first lever part,
wherein the third protruding portion is adjacent to the second lever part,
wherein the first lever part is configured to be folded so that the first side face of the first protruding portion and the first side face of the second protruding portion are in direct contact with each other, and
wherein the second lever part is configured to be folded so that the second side face of the first protruding portion and the first side face of the third protruding portion are in direct contact with each other.

14. The mold of claim 13, wherein each of the first protruding portion, the second protruding portion, and the third protruding portion extends in a second direction crossing the thickness direction and the first direction,
wherein a plurality of first protrusions protruding from the first protruding portion in the thickness direction and spaced apart from each other in the second direction are on the first protruding portion,
wherein a plurality of second protrusions protruding from the second protruding portion in the thickness direction and spaced apart from each other in the second direction are on the second protruding portion, and
wherein a plurality of third protrusions protruding from the third protruding portion in the thickness direction and spaced apart from each other in the second direction are on the third protruding portion.

15. The mold of claim 14, wherein a first side face of each of the plurality of first protrusions faces a first side face of each of the plurality of second protrusions, wherein a second side face of each of the plurality of first protrusions faces a first side face of each of the plurality of third protrusions, wherein the first side face of each of the plurality of first protrusions is aligned with the first side face of the first protruding portion, wherein the second side face of each of the plurality of first protrusions is aligned with the second side face of the first protruding portion, wherein the first side face of each of the plurality of second protrusions is aligned with the first side face of the second protruding portion, and wherein the first side face of each of the plurality of third protrusions is aligned with the first side face of the third protruding portion.

16. The mold of claim 15, wherein each of the plurality of first protrusions has a first printing face as an end face thereof in the thickness direction, wherein each of the plurality of second protrusions has a second printing face as an end face thereof in the thickness direction, wherein each of the plurality of third protrusions has a third printing face as an end face thereof in the thickness direction, and wherein the first lever part and the second lever part are configured to be folded so that one side of the first printing face and the second printing face contact each other and the other side of the first printing face and the third printing face contact each other.

17. The mold of claim 16, wherein the first lever part, the second lever part, and the bendable part are integrally formed with each other and comprise an elastic material.

* * * * *